United States Patent
Miao et al.

(10) Patent No.: US 12,276,742 B2
(45) Date of Patent: Apr. 15, 2025

(54) METHOD FOR POSITIONING, TERMINAL, AND NETWORK-SIDE DEVICE

(71) Applicant: DATANG MOBILE COMMUNICATIONS EQUIPMENT CO., LTD., Beijing (CN)

(72) Inventors: Deshan Miao, Beijing (CN); Bin Ren, Beijing (CN); Ren Da, Bejing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 359 days.

(21) Appl. No.: 17/767,921

(22) PCT Filed: Nov. 9, 2020

(86) PCT No.: PCT/CN2020/127573
§ 371 (c)(1),
(2) Date: Apr. 11, 2022

(87) PCT Pub. No.: WO2021/093710
PCT Pub. Date: May 20, 2021

(65) Prior Publication Data
US 2023/0194648 A1    Jun. 22, 2023

(30) Foreign Application Priority Data
Nov. 11, 2019  (CN) .......................... 201911094955.7

(51) Int. Cl.
*G01S 5/02*    (2010.01)
*G01S 5/00*    (2006.01)
(Continued)

(52) U.S. Cl.
CPC .......... *G01S 5/0072* (2013.01); *H04L 5/0051* (2013.01); *H04W 64/006* (2013.01)

(58) Field of Classification Search
CPC .... G01S 5/0072; H04L 5/0051; H04W 4/023; H04W 4/025; H04W 4/026; H04W 4/027; H04W 4/40
See application file for complete search history.

(56) References Cited

U.S. PATENT DOCUMENTS 7,295,159 B1    11/2007  Belcea et al.
9,942,705 B1 *  4/2018   Haney .................. H04W 4/029
(Continued)

FOREIGN PATENT DOCUMENTS

CN    101160553 A    4/2008
CN    101336555 A    12/2008
(Continued)

*Primary Examiner* — Siu M Lee
(74) *Attorney, Agent, or Firm* — Kilpatrick Townsend & Stockton LLP

(57) ABSTRACT

Disclosed are a method for positioning, a terminal, and a network-side device, which relate to the field of communications and are used to provide a means for positioning in a V2X scenario and simplify a positioning flow in the V2X scenario. In the embodiments of the present application, a first terminal determines position information of a second terminal relative to the first terminal according to received auxiliary positioning information. A means for positioning a peer device by the first terminal in the V2X scenario is provided. With this means, measuring the positions of the first terminal and the second terminal by relying on base stations is avoided, to simplify the flow of positioning the second terminal by the first terminal in the V2X scenario; and the applicability thereof is relatively high.

13 Claims, 11 Drawing Sheets

(51) Int. Cl.
*H04L 5/00* (2006.01)
*H04W 64/00* (2009.01)

(56) References Cited

U.S. PATENT DOCUMENTS

| | | | |
|---|---|---|---|
| 11,217,042 B2 * | 1/2022 | Kishikawa | G08G 1/04 |
| 2008/0153509 A1 * | 6/2008 | Piekarski | H04W 64/00 |
| | | | 455/456.2 |
| 2010/0156708 A1 | 6/2010 | Chen | |
| 2016/0095080 A1 * | 3/2016 | Khoryaev | G01S 5/0284 |
| | | | 455/456.1 |
| 2017/0108576 A1 * | 4/2017 | Xu | G01S 3/12 |
| 2017/0142682 A1 * | 5/2017 | Gunnarsson | G01S 1/20 |
| 2017/0303080 A1 | 10/2017 | Stitt et al. | |
| 2018/0322776 A1 * | 11/2018 | Bararsani | G08G 1/0116 |
| 2019/0190806 A1 * | 6/2019 | Bhushan | H04W 72/20 |
| 2019/0239181 A1 * | 8/2019 | Gangakhedkar | H04W 64/00 |
| 2020/0236718 A1 * | 7/2020 | Sundararajan | H04W 74/0833 |
| 2020/0408871 A1 * | 12/2020 | Da | G01S 1/20 |
| 2021/0058889 A1 * | 2/2021 | Zhang | G01S 5/10 |
| 2022/0321293 A1 * | 10/2022 | Ren | H04W 72/20 |
| 2022/0365163 A1 * | 11/2022 | Baek | H04W 4/40 |

FOREIGN PATENT DOCUMENTS

| | | |
|---|---|---|
| CN | 105891811 A | 8/2016 |
| CN | 110233903 A | 9/2019 |
| JP | H11215543 A | 8/1999 |
| JP | 2001059740 A | 3/2001 |
| JP | 2009059199 A | 3/2009 |
| JP | 2017525943 A | 9/2017 |
| JP | 6301569 B1 | 3/2018 |
| JP | 2018509611 A | 4/2018 |
| JP | 2018091071 A | 6/2018 |
| JP | 2018534817 A | 11/2018 |
| KR | 20110123231 A | 11/2011 |
| WO | 2018106467 A1 | 6/2018 |
| WO | 2018167175 A1 | 9/2018 |

* cited by examiner

METHOD FOR POSITIONING, TERMINAL, AND NETWORK-SIDE DEVICE

CROSS-REFERENCE OF RELATED APPLICATIONS

The present application is a National Stage of International Application No. PCT/CN2020/127573, filed on Nov. 9, 2020, which claims the priority from Chinese Patent Application No. 201911094955.7, filed with the Chinese Patent Office on Nov. 11, 2019 and entitled "Positioning Method, Terminal, and Network-Side Device", both of which are hereby incorporated by reference in their entireties.

FIELD OF DISCLOSURE

The disclosure relates to the field of communication technologies, and in particular, to a positioning method, a terminal and a network-side device.

BACKGROUND

At present, there are two main communication modes in the field of wireless communication:
the communication mode via network and the direct communication mode.
1. Communication Mode Via Network.

The traditional communication mode via network is as shown in FIG. 1, in which the Uu interface (the wireless interface between a base station and a terminal) is used between the base station and a User Equipment (UE). In FIG. 1, UE1 and UE2 are taken as an example.

For the communication mode via network, if a sending terminal (UE) wants to send data, the data is firstly sent to the base station through the Uu interface between the terminal and its serving base station, and then the base station sends the received data to an external server through a core network device, and the external server determines whether the data needs to be sent to other terminals; if so, the data is forwarded to a serving base station of a receiving terminal, and the serving base station of the receiving terminal then sends the data to the receiving terminal through the Uu interface.
2. Direct Communication Mode.

The direct communication mode is as shown in FIG. 2.

The direct communication is implemented by the Device to Device (D2D) technology between terminals.

The Vehicle-to-Everything (V2X) communication is a hot topic in the communication field. The V2X communication mainly includes three aspects: Vehicle-to-Vehicle (V2V): communications between On Broad Units (OBUs) on a vehicle. Vehicle-to-Infrastructure (V2I): communications between vehicles and RSUs (Road Side Units). V2P (Vehicle-to-Pedestrian): communications between vehicles and pedestrians.

At present, in the communication mode via network shown in the above 1, a variety of methods for positioning a terminal are defined, for example, the 3rd Generation Partnership Project (3GPP) defines a UE positioning method through measuring a Positioning Reference Signal (PRS) of the 3GPP wireless communication system, such as Observed Time Difference of Arrival (OTDOA), Uplink Time Difference of Arrival (UTDOA), etc., but all the above methods rely on base stations to position a terminal.

The existing process for positioning a terminal using the above method is relatively complicated, and the absolute position of the terminal needs to be determined according to base stations. In the V2X communication scenario, it is necessary to obtain the relative position between vehicles. Currently, there is no positioning method for the V2X scenario.

BRIEF SUMMARY

The disclosure provides a positioning method, a terminal and a network-side device, and to provide a positioning method in the V2X scenario and simplify the positioning process in the V2X scenario.

In a first aspect, a positioning method according to an embodiment of the disclosure includes:
obtaining, by a first terminal, positioning auxiliary information; and determining position information of a second terminal relative to the first terminal according to the obtained positioning auxiliary information.

In the above method, the first terminal determines the position information of the second terminal relative to the first terminal according to the received positioning auxiliary information, to provide a way for the first terminal to position the second terminal in the V2X scenario, avoiding the need for relying on base stations to measure the positions of the first terminal and the second terminal, and further simplifying the process for the first terminal to position the peer terminal (the second terminal) in the V2X scenario, and the applicability is strong.

In one embodiment, the obtaining, by a first terminal, positioning auxiliary information, includes:
obtaining, by the first terminal, timestamp information of a sending moment of a first positioning signal by sending the first positioning signal to the second terminal;
obtaining, by the first terminal, timestamp information of a receiving moment of a second positioning signal by receiving the second positioning signal sent by the second terminal, and receiving time difference information sent by the second terminal; where the time difference information is used to indicate a time difference between time when the second terminal receives the first positioning signal and time when the second terminal sends the second positioning signal;
the determining, by the first terminal, position information of a second terminal relative to the first terminal according to the obtained positioning auxiliary information, includes: determining, by the first terminal, a relative distance between the second terminal and the first terminal according to the timestamp information of the sending moment of the first positioning signal, the timestamp information of the receiving moment of the second positioning signal and the time difference information; and determining a relative position between the second terminal and the first terminal according to the relative distance between the second terminal and the first terminal.

In the above method, the first terminal determines the relative distance between the second terminal and the first terminal according to the timestamp information of the sending moment of the first positioning signal, the timestamp information of the receiving moment of the second positioning signal and the time difference information, and determines the relative position between them according to the relative distance. The above process has a low requirement on the time synchronization of the first terminal and the second terminal, avoids positioning through base stations, is simple to perform positioning, and has the stronger applicability.

In one embodiment, the positioning auxiliary information further includes speed information and speed direction information of the second terminal;

the determining, by the first terminal, position information of a second terminal relative to the first terminal according to the obtained positioning auxiliary information, includes:

determining, by the first terminal, a relative distance between the second terminal and the first terminal according to speed information of the first terminal, speed direction information of the first terminal, the speed information of the second terminal, the speed direction information of the second terminal, the timestamp information of the sending moment of the first positioning signal, the timestamp information of the receiving moment of the second positioning signal and the time difference information; and determining a relative position between the second terminal and the first terminal according to the relative distance between the second terminal and the first terminal.

In the above method, the relative position between the first terminal and the second terminal is determined in combination with the displacements of the first terminal itself and the second terminal during the positioning process, the positioning precision is high, and the positioning accuracy is improved.

In one embodiment, the obtaining, by a first terminal, positioning auxiliary information, includes:

obtaining, by the first terminal, receiving time of a second positioning signal by receiving the second positioning signal sent by the second terminal, and receiving timestamp information of a sending moment of the second positioning signal;

the determining, by the first terminal, position information of a second terminal relative to the first terminal according to the obtained positioning auxiliary information, includes:

determining, by the first terminal, a relative distance between the second terminal and the first terminal according to timestamp information of a receiving moment of the second positioning signal and the timestamp information of the sending moment of the second positioning signal; and determining a relative position between the second terminal and the first terminal according to the relative distance between the second terminal and the first terminal.

In the above method, the positioning mode is simpler; and the higher the time synchronization accuracy between the first terminal and the second terminal, the higher the positioning accuracy.

In one embodiment, the determining a relative position between the second terminal and the first terminal according to the relative distance between the second terminal and the first terminal, includes:

determining, by the first terminal, the relative position between the second terminal and the first terminal according to an Angle of Arrival of the second positioning signal and the relative distance of the second terminal relative to the first terminal.

In one embodiment, the obtaining, by a first terminal, positioning auxiliary information, includes: obtaining, by the first terminal, positioning auxiliary information sent by a network-side device;

the positioning auxiliary information includes: position information of the first terminal relative to the network-side device, position information of the second terminal relative to the network-side device, and position information of the network-side device; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In the above method, the first terminal performs positioning in combination with the assistance of the network-side device, that is, positioning is performed by multiple pieces of positioning auxiliary information, improving the positioning reliability.

In one embodiment, the obtaining, by a first terminal, positioning auxiliary information, further includes:

obtaining, by the first terminal, positioning auxiliary information sent by a network-side device; where the positioning auxiliary information further includes: position information of the first terminal relative to the network-side device, position information of the second terminal relative to the network-side device, and position information of the network-side device; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In the above method, the terminal can obtain the relative position information between it and terminals according to the positioning auxiliary information notified by the network-side device in the positioning mode with the assistance of the network-side device, and the terminal can obtain the surrounding vehicle condition information relatively quickly and also reduces the interactions between terminals, saving the signaling overhead.

In one embodiment, the obtaining, by a first terminal, positioning auxiliary information, includes: obtaining, by the first terminal, positioning auxiliary information sent by a network-side device;

the positioning auxiliary information includes: absolute position information of the first terminal and absolute position information of the second terminal; where the absolute position information of the first terminal is obtained by the network-side device through a third positioning signal sent by the first terminal, and the absolute position information of the second terminal is obtained by the network-side device through a fourth positioning signal sent by the second terminal.

In a second aspect, a positioning method according to an embodiment of the disclosure includes:

sending, by a second terminal, positioning auxiliary information to a first terminal, and the positioning auxiliary information is used for determining position information relative between the first terminal and the second terminal by the first terminal.

In one embodiment, the second terminal sends a second positioning signal and time difference information to the first terminal after receiving a first positioning signal sent by the first terminal; where the time difference information is used to indicate a time difference between time when the second terminal receives the first positioning signal and time when the second terminal sends the second positioning signal.

In one embodiment, the second terminal sends speed information and speed direction information of the second terminal to the first terminal.

In one embodiment, the second terminal sends a second positioning signal and timestamp information of a sending moment of the second positioning signal to the first terminal.

In one embodiment, the second terminal sends a third positioning signal to a network-side device, and the network-side device determines position information of the second terminal relative to the network-side device or absolute position information of the second terminal according to the third positioning signal.

In a third aspect, a positioning method according to an embodiment of the disclosure includes:
  receiving, by a network-side device, a third positioning signal sent by a first terminal and a fourth positioning signal sent by a second terminal;
  sending, by the network-side device, positioning auxiliary information to the first terminal.

In one embodiment, the positioning auxiliary information includes: position information of the first terminal relative to the network-side device, position information of the second terminal relative to the network-side device, and position information of the network-side device; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In one embodiment, the positioning auxiliary information includes: absolute position information of the first terminal and absolute position information of the second terminal; where the absolute position information of the first terminal is obtained by the network-side device through the third positioning signal sent by the first terminal, and the absolute position information of the second terminal is obtained by the network-side device through the fourth positioning signal sent by the second terminal.

In a fourth aspect, an embodiment of the disclosure provides a first terminal for positioning, where the first terminal includes: a processor, a memory and a transceiver;
  where the processor is configured to read programs in the memory to:
  obtain positioning auxiliary information, and determine position information of a second terminal relative to the first terminal according to the obtained positioning auxiliary information.

In a possible implementation, the processor is configured to:
  obtain timestamp information of a sending moment of a first positioning signal by sending the first positioning signal to the second terminal; obtain timestamp information of a receiving moment of a second positioning signal by receiving the second positioning signal sent by the second terminal, and receive time difference information sent by the second terminal; where the time difference information is used to indicate a time difference between time when the second terminal receives the first positioning signal and time when the second terminal sends the second positioning signal; determine a relative distance between the second terminal and the first terminal according to the timestamp information of the sending moment of the first positioning signal, the timestamp information of the receiving moment of the second positioning signal and the time difference information; and determine a relative position between the second terminal and the first terminal according to the relative distance between the second terminal and the first terminal.

In a possible implementation, the positioning auxiliary information further includes speed information and speed direction information of the second terminal; and the processor is specifically configured to:
  determine a relative distance between the second terminal and the first terminal according to speed information of the first terminal, speed direction information of the first terminal, the speed information of the second terminal, the speed direction information of the second terminal, the timestamp information of the sending moment of the first positioning signal, the timestamp information of the receiving moment of the second positioning signal and the time difference information; and determine a relative position between the second terminal and the first terminal according to the relative distance between the second terminal and the first terminal.

In a possible implementation, the processor is configured to:
  obtain receiving time of a second positioning signal by receiving the second positioning signal sent by the second terminal, and receive timestamp information of a sending moment of the second positioning signal;
  determine a relative distance between the second terminal and the first terminal according to timestamp information of a receiving moment of the second positioning signal and the timestamp information of the sending moment of the second positioning signal; and determine a relative position between the second terminal and the first terminal according to the relative distance between the second terminal and the first terminal.

In a possible implementation, the processor is configured to:
  determine the relative position between the second terminal and the first terminal according to an Angle of Arrival of the second positioning signal and the relative distance of the second terminal relative to the first terminal.

In a possible implementation, the processor is configured to:
  obtain positioning auxiliary information sent by a network-side device;
  the positioning auxiliary information includes: position information of the first terminal relative to the network-side device, position information of the second terminal relative to the network-side device, and position information of the network-side device; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In a possible implementation, the processor is further configured to:
  obtain positioning auxiliary information sent by a network-side device; where the positioning auxiliary information further includes: position information of the first terminal relative to the network-side device, position information of the second terminal relative to the network-side device, and position information of the network-side device; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In a possible implementation, the processor is further configured to:

obtain positioning auxiliary information sent by a network-side device;

the positioning auxiliary information includes: absolute position information of the first terminal and absolute position information of the second terminal; where the absolute position information of the first terminal is obtained by the network-side device through a third positioning signal sent by the first terminal, and the absolute position information of the second terminal is obtained by the network-side device through a fourth positioning signal sent by the second terminal.

In a fifth aspect, an embodiment of the disclosure provides a second terminal for positioning, where the first terminal includes: a processor, a memory and a transceiver;

where the processor is configured to read programs in the memory to:

send positioning auxiliary information to a first terminal and the first terminal determines position information relative between the first terminal and the second terminal according to the positioning auxiliary information.

In one embodiment, a second positioning signal and time difference information are sent to the first terminal after receiving a first positioning signal sent by the first terminal; where the time difference information is used to indicate a time difference between time when the second terminal receives the first positioning signal and time when the second terminal sends the second positioning signal.

In one embodiment, speed information and speed direction information of the second terminal are sent to the first terminal.

In one embodiment, a second positioning signal and timestamp information of a sending moment of the second positioning signal are sent to the first terminal.

In one implementation, the processor is further configured to:

send a third positioning signal to a network-side device, and the network-side device determines position information of the second terminal relative to the network-side device or absolute position information of the second terminal according to the third positioning signal.

In a sixth aspect, an embodiment of the disclosure provides a network-side device for positioning, where the network-side device includes: a processor, a memory and a transceiver;

the processor is configured to receive a third positioning signal sent by a first terminal and a fourth positioning signal sent by a second terminal; and send positioning auxiliary information to the first terminal.

In one embodiment, the positioning auxiliary information includes: position information of the first terminal relative to the network-side device, position information of the second terminal relative to the network-side device, and position information of the network-side device; and the network-side device obtains the position information of the first terminal relative to the network-side device through the third positioning signal sent by the first terminal, and obtains the position information of the second terminal relative to the network-side device through the four positioning signal sent by the second terminal.

In one embodiment, the positioning auxiliary information includes: absolute position information of the first terminal and absolute position information of the second terminal; where the absolute position information of the first terminal is obtained by the network-side device through the third positioning signal sent by the first terminal, and the absolute position information of the second terminal is obtained by the network-side device through the fourth positioning signal sent by the second terminal.

In a seventh aspect, an embodiment of the disclosure further provides a computer storage medium storing a computer program thereon, where the program, when executed by a processor, implements the steps of any positioning method.

DETAILED DESCRIPTION OF THE EMBODIMENTS

In order to illustrate the embodiments of the disclosure more clearly, the accompanying figures which need to be used in describing the embodiments will be introduced below briefly. The accompanying figures described below are only some embodiments of the disclosure, and other accompanying figures can also be obtained.

The existing 3GPP defines a variety of methods for positioning terminals, such as OTDOA, UL-TDOA, and so on. The existing method of positioning a terminal in the scenario of communication via a network will be illustrated below by taking UL-TDOA as an example.

Figure 3:
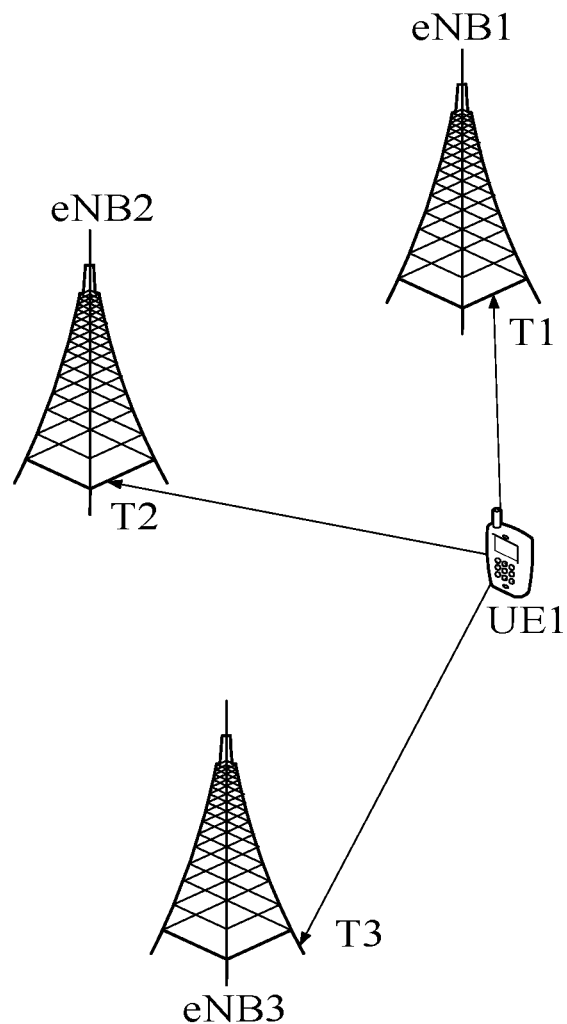
FIG. 3 is a schematic diagram of a scenario where the UL-TDOA (Uplink-Time Different Of Arrival) is used for terminal positioning.

As shown in FIG. 3, it is a schematic diagram of an application scenario where a UE is positioned by means of UL-TDOA. The communication system shown in FIG. 3 includes Evolved NodeB (eNB) 1, eNB2, eNB3 and UE1. The process of positioning by means of UL-TDOA based on the communication system is as follows.

Step 1: the UE1 sends an uplink Positioning Reference Signal (PRS) to the eNB1, eNB2 and eNB3 simultaneously.

As shown in FIG. 3, the UE1 sends the uplink PRS to the eNB1, eNB2 and eNB3 simultaneously, where the time when the eNB1 receives the PRS is T1 (i.e., receiving moment), the time when the eNB2 receives the PRS is T2, and the time when the eNB3 receives the PRS is T3. The above T1, T2 and T3 are moments at which the base stations receive the PRS; but in practical applications, the base stations only record the differences between T1, T2, T3 and the current timing reference point. For example, the base station expects to receive the PRS at symbol 1, but the arrival time of the PRS is 1 us offset from the symbol 1 in fact, so it is considered that the time length of the transmission distance is 1 us, and the base station can transmit the time offset value to a positioning server for position calculation.

Step 2: the positioning server measures the time difference between two adjacent base stations among the eNB1, eNB2 and eNB3.

The positioning server (which may be any one of the eNB1, eNB2 or eNB3, or an independent device other than the eNB1, eNB2 and eNB3) measures the relative time difference between any two of adjacent base stations, i.e., the relative time difference T1–T2 between the base station 1 and base station 2 receiving the PRS, the relative time difference T1–T3 between the base station 1 and base station 3 receiving the PRS, and the relative time difference T2–T3 between the base station 2 and base station 3 receiving the PRS. In one embodiment, the positioning server receives the arrival time difference obtained by each base station when detecting the PRS, for positioning calculation.

Step 3: the positioning server calculates the geographic location (absolute location) of the UE according to the geographic locations of the three base stations eNB1, eNB2 and eNB3 and the relative time differences T1–T2, T1–T3 and T2–T3.

For example, for a simple example, assuming that the eNB1, eNB2 and eNB3 are located at the vertices of a same equilateral triangle respectively and the values of T1–T2, T1–T3 and T2–T3 are all 0, then the positioning server determines that the UE1 is at the center of the equilateral triangle formed by the eNB1, eNB2 and eNB3.

At present, when positioning a terminal in a communication system via a network, the terminal needs to exchange information with base stations, and the information may also need to be exchanged among base stations, and to position the terminal and obtain the absolute position of the terminal. For the V2X communication, when the position information of the peer terminal is to be determined between vehicles, if the above positioning method is used, two vehicles need to send positioning reference signals to respective adjacent base stations simultaneously, and then the base stations on both sides or two terminals exchange their absolute position information. The positioning process is complicated, and there is no solution for positioning the V2X terminals at present.

In view of this, an embodiment of the present application provides a positioning method in which a first terminal receives the positioning auxiliary information and determines the position information of a second terminal relative to the first terminal according to the positioning auxiliary information, without relying on base stations to obtain the position information of the first terminal itself and the position information of the second terminal, providing a positioning method between terminals suitable for the V2X scenario.

The embodiment of the present application may be applied to the 5G system, or to a future communication system or other similar communication systems. In addition, the embodiment of the present application can be applied to cellular links, and can also be applied to links between devices, such as D2D links. The D2D link or V2X link may also be referred to as sidelink, where the sidelink may also be referred to as side link, secondary link, or directly-connected channel, etc. In the embodiments of the present application, the above terms all refer to links established between devices of the same type, and have the same meaning. The so-called devices of the same type may be a link between terminal devices, or a link between base stations, or a link between relay nodes, which is not limited in the embodiments of the present application. The links between terminal devices include D2D links defined by the 3GPP version (Rel)-12/13, and also vehicle-to-vehicle, vehicle-to-mobile or vehicle-to-any entity V2X links defined by the 3GPP for the Internet of Vehicles, including Rel-14/15. They also includes V2X links based on the New Radio (NR) system of currently-studied Rel-16 and subsequent versions of 3GPP.

Figure 4:
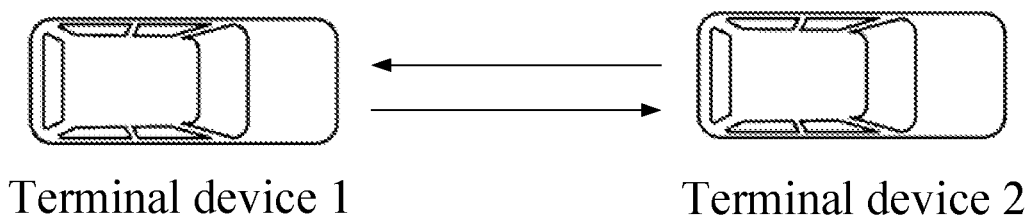
FIG. 4 is a schematic diagram of a network structure according to the present application.

The network architecture applied in the embodiments of the present application will be introduced below. Referring to FIG. 4, it is a schematic diagram of a network architecture applied in the embodiments of the present application, including two terminal devices, which are a terminal device 1 (referred to as first terminal hereinafter) and a terminal device 2 (referred to as second terminal hereinafter) respectively.

Figure 1:
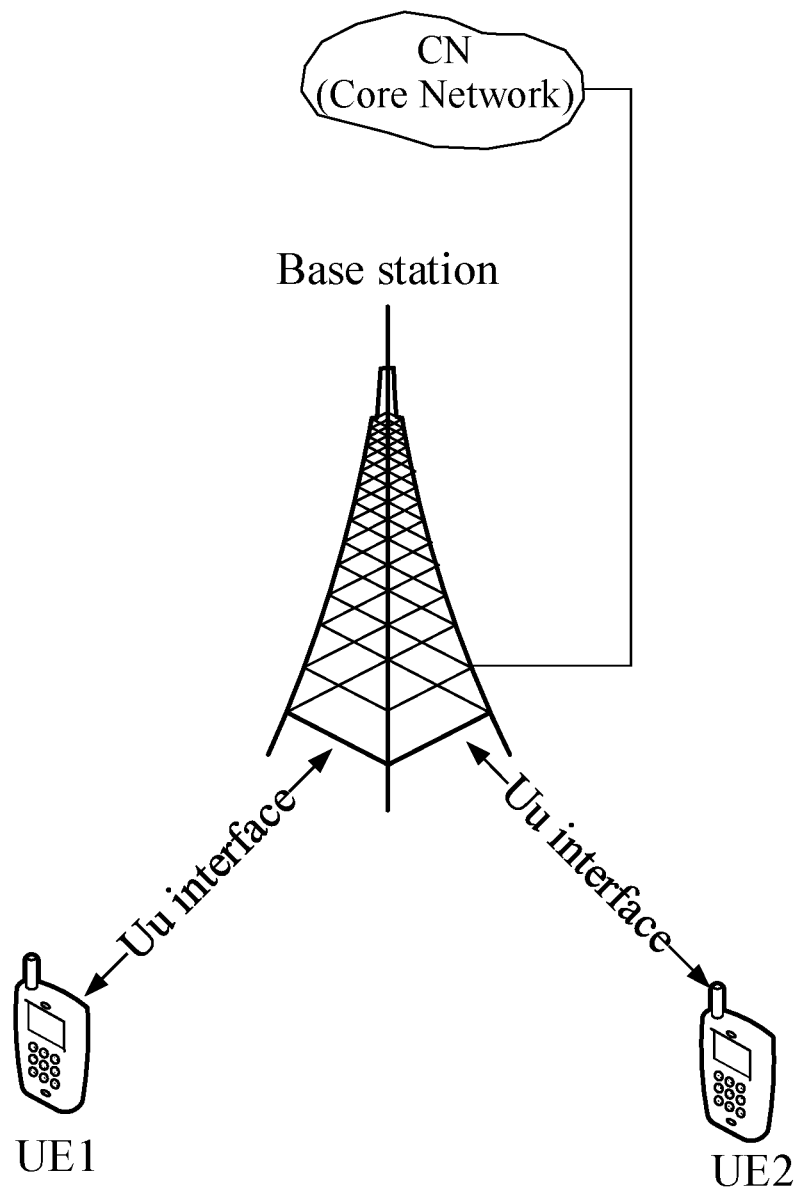
FIG. 1 is a schematic diagram of communication via a network in the related art.
Figure 2:
FIG. 2 is a schematic diagram of direct communication of a terminal in the related art.

The two terminal devices communicate with each other through a directly-connected channel (sidelink). Of course, the number of terminal devices in FIG. 1 is just an example. In one embodiment, the terminal device in FIG. 1 is a vehicle-mounted terminal device or a vehicle as an example, but the terminal device in the embodiment of the present application is not limited thereto.

It should be understood that FIG. 4 is only a simplified schematic diagram for easy understanding, and the communication system may also include other network devices or other terminal devices, such as network-side devices, which are not shown in FIG. 4.

Before introducing the embodiments of the present application, some terms in the embodiments of the present application will be explained at first.

(1) Terminal device may be a wireless terminal device that can receive the network device scheduling and the indication information, and the wireless terminal device may be a device for providing the voice and/or data connectivity to the user, a handheld device with the wireless connection function, or other processing device connected to the wireless modem, for example, a terminal device in a 5G network, or a terminal device in a future evolved Public Land Mobile Network (PLMN), or a terminal device in an NR communication system, etc.

The various terminal devices described above can be considered as vehicle-mounted terminal devices if they are located on a vehicle (for example, placed in the vehicle or installed in the vehicle). For example, the vehicle-mounted terminal device is also called OBU.

(2) Network device, including for example Access Network (AN) device, such as base station (e.g., access point), may refer to a device that communicates with wireless terminal devices through one or more cells at an air interface in the access network, or for example, a network device in the V2X technology is an RSU. The base station may be used to perform the inter-conversion between the received air frame and the Internet Protocol (IP) packet, and used as a router between the terminal device and the rest of the access network, where the rest of the access network may include an IP network. The RSU may be a fixed infrastructure entity supporting V2X applications and may exchange messages with other entities supporting V2X applications. The network device may also coordinate the attribute management of the air interface. For example, the network device may include an evolutional Node B (NodeB or eNB or e-NodeB) in the Long Term Evolution (LTE) system or LTE-Advanced (LTE-A) system, or may include a next generation Node B (gNB) in the 5G NR system, or may include a Centralized Unit (CU) and a Distributed Unit (DU) in the Cloud Radio Access Network (Cloud RAN) system, which is not limited in the embodiments of the present application.

(3) The terms "system" and "network" in the embodiments of the present application can be used interchangeably. "Multiple" refers to two or more than two. In view of this, "multiple" may also be understood as "at least two" in the embodiments of the present application. "At least one" can be understood as one or more, such as one, two or more. For example, including at least one means including one, two or more, and does not limit which ones are included. For example, including at least one of A, B and C may mean including A, B, C, A and B, A and C, B and C, or A and B and C. Similarly, the understanding of descriptions such as "at least one" is similar.

(4) The term "and/or" in the embodiments of the present application describes the association relationship of associated objects, indicating that there may be three relationships, for example, A and/or B may represent: only A, both A and B, and only B. Furthermore, the character "/" generally indicates that the associated objects have a kind of "or" relationship, unless otherwise specified.

Unless stated to the contrary, the ordinal numbers such as "first" and "second" mentioned in the embodiments of the present application are used to distinguish objects, and are not used to limit the order, sequence, priority or importance of objects. For example, the first time domain resource and the second time domain resource are only used for distinguishing different time domain resources, and do not limit the priority or importance of these two time domain resources.

Next, the embodiments of the present application will be introduced with reference to the drawings. Hereinafter, without loss of generality, the embodiments of the present application will be described in detail by taking the interaction process between two terminal devices as an example.

Figure 5:
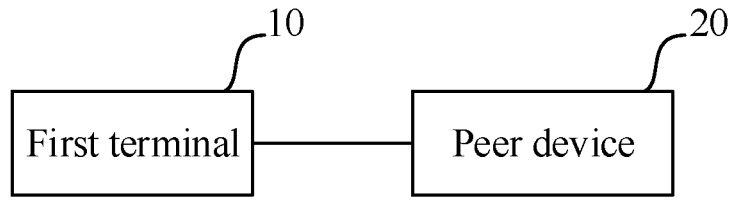
FIG. 5 is a schematic diagram of a positioning system according to the present application.

As shown in FIG. 5, an embodiment of the disclosure provides a positioning system, including: a first terminal 10 and a peer device 20.

The first terminal 10 is configured to receive the positioning auxiliary information, and determine the position information of the second terminal relative to the first terminal according to the received positioning auxiliary information.

The peer device 20 is configured to send the positioning auxiliary information to the first terminal 10.

In some embodiments, the above-mentioned peer device 20 may be the second terminal.

With the above method, the first terminal determines the position information of the second terminal relative to the first terminal according to the received positioning auxiliary information, to provide a way for the first terminal to position the second terminal in the V2X scenario, avoiding the need for relying on base stations to measure the position of the second terminal, and further simplifying the process for the first terminal to position the second terminal in the V2X scenario, and the applicability is strong.

In the positioning system provided by the present application, the peer device may be a terminal device having a directly-connected channel with the first terminal, or may be a network-side device. The network-side device determines the position information of the first terminal and the second terminal, and notifies the first terminal and the second terminal respectively of the positioning auxiliary information for indicating the relative position information between the first terminal and the second terminal, to realize the positioning of the second terminal by the first terminal to obtain the relative position information between the second terminal and the first terminal in the V2X scenario.

Here, the relative position information in this embodiment of the present application includes the relative distance between them and/or the relative direction angle between them.

There are various manners for determining the relative distance between them in the embodiments of the present application, including but not limited to:
1) Determining according to the transmission duration of the positioning signal;
2) Determining according to the relationship between transmission loss and transmission distance of the signal.

There are also various manners for determining the relative direction angle between them in embodiments of the present application, for example, according to the direction of arrival of the positioning signal, etc. Therefore, the positioning signal in the embodiments of the present application is a signal that can be transmitted between terminals or between a terminal and a network-side device, for example, including but not limited to one or more of:

PRS, Channel State Information Reference Signal (CSI-RS), Demodulation Reference Symbol (DMRS), Synchronization Signal Block (SSB) or data signal, where the data signal is the user data transmitted through channels, such as Physical Uplink Shared Channel (PUSCH) signal, Physical Downlink Shared Channel (PDSCH) signal, etc.

In one embodiment, the manner in which the first terminal determines the relative position information of the second terminal relative to the first terminal itself will be introduced below by taking the PRS as the positioning signal as an example.

It should be noted that the positioning system shown in FIG. 5 is only used for illustration, and the positioning system may also include other devices that may be network devices or may also include other terminal devices. In one scenario, the first terminal may also be used as a peer device of other devices at the same time, which is not shown in FIG. 5.

It should be understood that the formed positioning system is different and the positioning method and process are also different when the peer device interacting with the first terminal is different. The positioning system shown in FIG. 5 will be described in detail below with reference to embodiments.

The following embodiments can be applied to the network architecture shown in FIG. 4. In order to simplify the distinction, UE1 represents the first terminal and UE2 represents the second terminal hereinafter.

Embodiment 1: A positioning system composed of UE1 and UE2 connected based on sidelink.

Embodiment 1 is the terminal-to-terminal relative position measurement based on Round-Trip Time (RTT). For example: it is the relative position measurement between vehicles in the V2X scenario.

Figure 6:
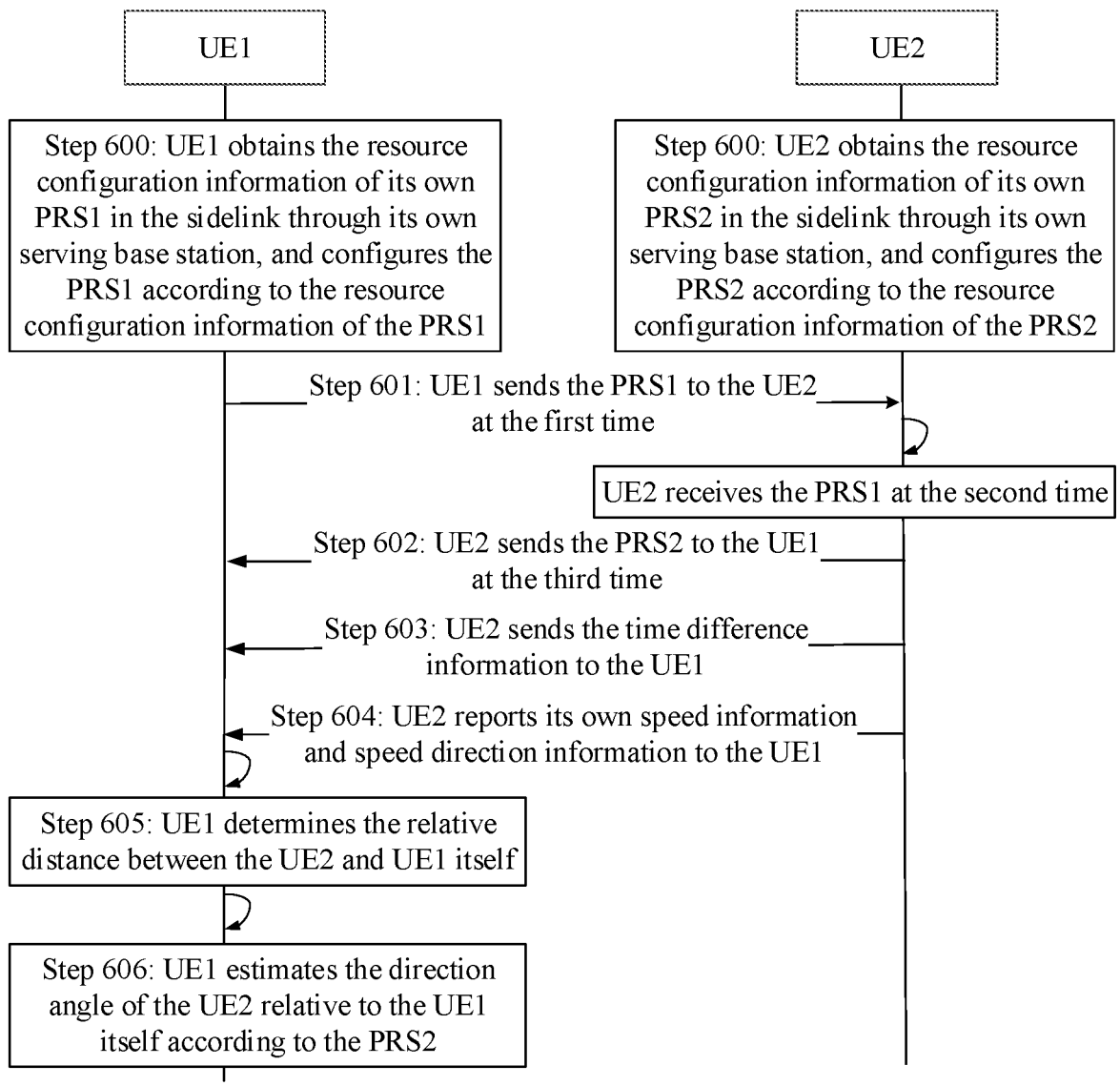
FIG. 6 is a schematic diagram of an interaction process for positioning in Embodiment 1 of the present application.

As shown in FIG. 6, it is a schematic diagram of the interaction process of Embodiment 1 provided in the present application, including the following steps.

Step 600: each terminal obtains the resource configuration information of its own PRS in the sidelink through its own serving base station.

The UE1 obtains the resource configuration information of the positioning reference signal PRS1 of the UE1 in the sidelink through the eNB1. The UE2 obtains the resource configuration information of the positioning reference signal PRS2 of the UE2 in the sidelink through the eNB2.

Here, each terminal performs data transmission with the base station through the Uu port. The eNB1 is the serving base station of the UE1, the eNB2 is the serving base station of the UE2, and the eNB1 and eNB2 may also be the same base station.

It should be noted that the manner in which the base station determines the resource configuration information of the PRS of the terminal in the sidelink and the manner in which the UE configures the PRS according to the PRS resource configuration information in step 600 are implemented based on the technologies in the existing mechanism, which will not be described in detail here.

It should be understood that the above is only an example, and if the positioning signal for positioning is different, then the step 600 is also different. For example, when the UE1 and UE2 obtain the positioning auxiliary information based on a data signal, the step 600 is not necessarily performed, or the step 600 is a step of specifically performing the configuration of a corresponding positioning signal.

Step 601: the UE1 sends the PRS1 to the UE2 at the first time.

The UE1 sends the PRS1 to the UE2, and accordingly, the UE2 receives the PRS1 sent by the UE1. Here, the timestamp of the sending moment at which the UE1 sends the PRS1 is recorded as first time (hereinafter referred to as T1), and the timestamp of the receiving moment at which the UE2 receives the PRS1 is recorded as second time (hereinafter referred to as T2). The timestamp information may be the absolute time or a serial number of the time domain resource. Specifically, for example, the serial number of the time domain resource may include but not limited to one or more: radio frame number, subframe number, symbol number, slot number, mini-slot number, etc.

Step 602: the UE2 sends the PRS2 to the UE1 at the third time.

The UE2 sends the PRS2 to the UE1, and accordingly, the UE1 receives the PRS2 sent by the UE2. Here, the timestamp of the sending moment at which the UE2 sends the PRS2 is recorded as third time (hereinafter referred to as T3), and the timestamp of the receiving moment at which the UE1 receives the PRS2 is recorded as fourth time (hereinafter referred to as T4).

Step 603: the UE2 sends the time difference information for indicating the interval duration between T3 and T2 to the UE1.

In this step, the time difference information sent by the UE2 to the UE1 may be the interval duration between T3 and T2 (that is, the time difference between T3 and T2) or T2 and T3.

For example, the time when the UE2 receives the PRS1 is 12:59:30 (T2), and the time when the UE2 sends the PRS2 is 13:05:30 (T3). Then the UE2 may send the interval duration between T2 and T3, i.e., the time difference value 6 min between 12:59:30 and 13:05:30, to the UE1; in another example, the UE2 may notify the UE1 of 12:59:30 (T2) and 13:05:30 (T3), and the UE1 determines the interval duration between T2 and T3.

Step 604: the UE2 reports its own speed information and speed direction information to the UE1.

In one embodiment, the UE2 may also report its own speed information and speed direction information to the UE1, where the speed direction of the UE2 is determined by the UE2 according to the included angle between its own moving speed and a preset reference direction. The included angle ranges from 0 to 360°.

Step 605: the UE1 determines the relative distance between the UE2 and it.

The UE1 obtains the positioning auxiliary information in the above manner, where the positioning auxiliary information includes: the timestamp information (T1) of the sending moment at which the UE1 sends the PRS1, the timestamp information (T4) of the receiving moment at which the UE1 receives the PRS2 sent by the UE2, and the time difference information sent by the UE2. The UE1 determines the position information of the UE2 relative to the UE1 itself according to the above positioning auxiliary information, where the determined position information includes the relative distance and/or relative direction angle. The ways to determine the relative distance will be illustrated at first.

There are many ways to determine the relative distance between UE1 and UE2 in the embodiments of the present application, and two are listed below.

In a first determining way: estimate the relative distance between UE1 and UE2 according to the PRS2.

The UE1 determines the relative distance between UE1 and UE2 according to the received power RSRP of the PRS2.

According to the relationship between transmission loss and transmission distance of the signal, the UE1 determines the transmission loss of the signal according to the received power RSRP when receiving the PRS2 and the transmit power of the PRS2, and to estimate the relative distance between UE1 and UE2.

In a second determining way: determine the relative distance between UE1 and UE2 according to the time information.

Figure 7:
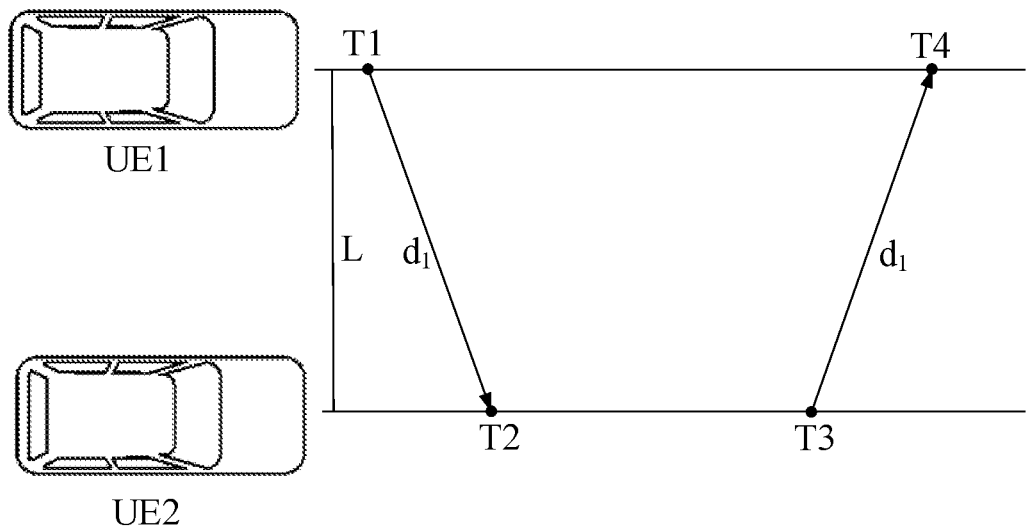
FIG. 7 is a schematic diagram of an application scenario for determining a relative distance according to an embodiment of the present application.

Exemplarily, as shown in FIG. 7, it is a schematic diagram of an application scenario of the positioning signal transmission of PRS1 and PRS2 when the UE1 and UE2 are in the relatively static state.

In the application scenario shown in FIG. 7, the relative distance between UE1 and UE2 satisfies:

$$d_1 = \Delta t/2 \times C_{light} \quad \text{(Formula 1)}$$

$$\Delta t = |T1-T4| - |T2-T3| \quad \text{(Formula 2)}$$

where ‖ represents the absolute value, $d_1$ represents the relative distance between UE1 and UE2; $C_{light}$ represents the air interface transmission rate, i.e., the speed of light; and $\Delta t$ represents the total transmission duration of PRS1 and PRS2.

In fact, the relative distance between UE1 and UE2 is L. It should be understood that the running speed of the vehicle is much less than the speed of light and the interval between T2 and T1 is relatively small, and similarly the interval between T4 and T3 is also relatively small, so it can be considered that $d_1$ is infinitely close to L, and thus L≈$d_1$ here.

The above calculation method can be applied to the case where the UE1 and UE2 are in the relatively static state or both the speed of UE1 and the speed of UE2 exceed a preset speed.

As another example, in one scenario, the UE2 reports its own speed information and speed direction information to the UE1, as in step 604. When determining the relative distance from the UE2, the UE1 determines the relative distance from the UE2 in combination with the speeds of the UE2 and the UE1 itself.

The UE1 determines the displacement of the UE2 in the positioning process, the displacement of the UE1 itself in this process, and the initial distance between the UE1 and the UE2, to determine the relative distance between the UE1 and the UE2. That is, the UE1 determines the actual distance between the second terminal and the first terminal according to the speed information of the UE1 itself, the speed direction information of the UE1, the speed information of the UE2, the speed direction information of the UE2, the timestamp information (T1) of the sending moment of the PRS1, the timestamp information (T4) of the receiving moment of the PRS2, and the time difference information; where the actual distance includes the initial distance between UE1 and UE2, and the total displacement (including the displacement in the horizontal direction and the displacement in the vertical direction) of the UE1 and UE2 during a period of time from the time when the first terminal sends the PRS1 to the time when the first terminal receives the PRS2.

Here, the speed direction information is the included angle between the speed of the terminal and a preset reference direction. As shown in FIG. 7, it is assumed that the reference direction is the horizontal direction in the map coordinate system. It should be understood that the same preset reference direction is used when the UE1 determines its own speed direction and the UE2 determines its own speed direction.

Figure 8:
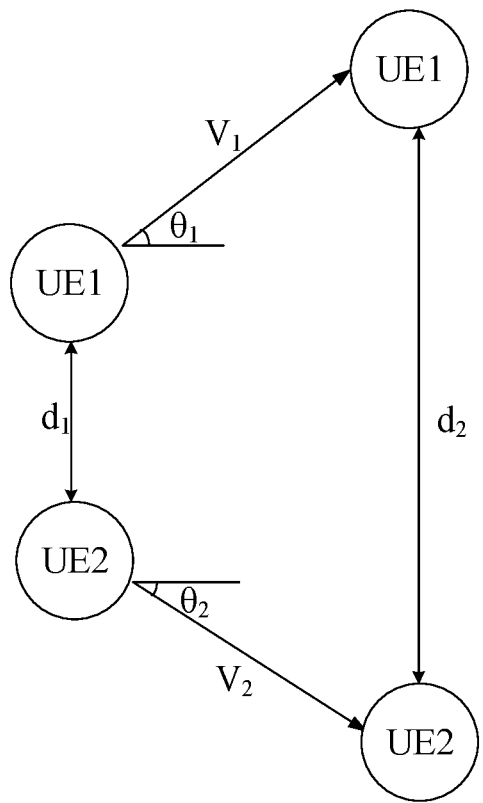
FIG. 8 is a schematic diagram of another application scenario for determining a relative distance according to an embodiment of the present application.

A simple example is given below for description. As shown in FIG. 8, it is a schematic diagram of another application scenario of the signal transmission of PRS1 and PRS2 provided by the present application. In this application scenario, assuming that the reference direction is the horizontal direction in the map coordinate system, the UE1 and UE2 have a relative motion trend in the vertical direction (perpendicular to the horizontal direction) and are in the relatively static state in the horizontal direction, and the initial distance between UE1 and UE2 is the distance $d_1$ in the vertical direction. Referring to FIG. 8, the speed direction of UE1 is the direction with an angle $\theta_1$ from the horizontal line, and the speed direction of UE2 is the direction with an angle $\theta_2$ from the horizontal line (assuming that the value of $\theta_1$ is positive, then the value of $\theta_2$ is negative).

In the application scenario shown in FIG. 8, the UE1 determines the relative distance from the UE2 in the following way, where $V_1$ refers to the moving direction of the UE1, and V2 refers to the moving direction of the UE2:

$$2d_1 + (V_1 \times \sin\theta_1 + V_2 \times \sin\theta_2) \times (T4-T1) = \Delta t \times C_{light} \quad \text{(Formula 3)}$$

$$\Delta t = (T1-T4) - (T2-T3) \quad \text{(Formula 4)}.$$

It can be seen from the Formula 3 and Formula 4 that the relative distance $d_2$ between UE1 and UE2 satisfies:

$$d_2 = d_1 + [(V_1 \times \sin\theta_1 + V_2 \times \sin\theta_2) \times (T4-T1)]/2 \quad \text{(Formula 5)}.$$

As another example, since the interval between T2 and T1 is relatively short, it can be considered that the UE1 and the position of the UE2 remain unchanged. Similarly, the interval between T4 and T3 is relatively short, and it can also be assumed that the UE1 and the position of the UE2 remain unchanged during this period of time. Therefore, in one scenario, the relative distance $d_3$ between UE1 and UE2 satisfies:

$$d_3 = d_1 + [(V_1 \times \sin\theta_1 + V_2 \times \sin\theta_2) \times (T3-T2)]/2 \quad \text{(Formula 6)}.$$

The above calculation method can be applied to the case when the UE1 and UE2 have a relative motion trend or when the speed of the UE1 and/or the speed of the UE2 exceeds a preset speed.

It should be noted that there is no time sequence between steps 603 and 604. The information sent by the UE2 to the UE1 in steps 603 and 604 may be implemented in step 602, that is, one or more of the time difference information, the speed information or the speed direction information of the UE2 may be sent together with or after the PRS2. That is, the UE2 may transmit a part or all of the information involved in steps 602 to 604 at one time. For example, the UE2 sends the PRS2, the time difference information, and its own speed information and speed direction information to the UE1 at the same time, or sends each information separately as shown in FIG. 6, or combines and then sends the information sent in steps 602 to 604 in pairs.

In one embodiment, the speed information and the speed direction information reported by the UE2 are the speed and the speed direction corresponding to the moment at which the UE2 sends the PRS2.

Step 606: the UE1 estimates the direction angle of the UE2 relative to it according to the PRS2.

The UE1 determines the direction angle of the UE2 relative to the UE1 according to the arrival angle of the PRS2. In one embodiment, the process of the UE1 to determine the arrival angle of the PRS2 is as follows: the UE1 receives the PRS2 sent by the UE2, the UE1 receives and obtains signals through an antenna array, and searches for a maximum value by matching through the local angle weighted vector, where the angle corresponding to the maximum value is the angle of direction of arrival, or the MUSIC algorithm is used to estimate the maximum angular component in the received signal, and to obtain the Angle of Arrival (AOA).

Here, the direction angle of the UE2 relative to the UE1 itself is the relative direction angle between two vehicles. For example, if the UE1 determines that the arrival angle of the PRS2 is directly in front of the UE1, then the UE1 can determine that the UE2 is located on a circle with the UE1 as the center and the determined relative distance as the radius after determining the relative distance from the UE2. After the direction angle of the UE2 relative to the UE1 is determined, a position can be uniquely determined according to the determined direction angle relative to the UE1 itself, where this position is the position of the UE2 relative to the UE1.

It should be noted that the above-mentioned estimation of the distance and the direction angle according to the PRS is implemented based on the prior art, and will not be described in detail here.

Correspondingly, the UE2 may also estimate the relative distance and the relative direction angle between it and the UE1 in combination with the PRS1 received by itself in the above manner, and to determine the relative position of the UE1.

In a possible scenario, the UE1 is a party to firstly initiate positioning during the interaction with the UE2. In fact, the UE1 can send the PRS1 to the UE2, and can also execute the process of the UE2 after receiving a positioning reference signal sent by another terminal, to feed back the positioning reference information of the UE1 to the peer terminal.

It should be noted that there is no time sequence between steps 604 and 605. The UE1 may perform the steps 604 and 605 at the same time, or perform the step 605 at first and then perform the step 604, that is, the UE1 may also determine the relative direction angle at first and then determine the relative distance, or determine the relative distance and relative direction angle at the same time. Further, the above-mentioned process in which the UE1 determines the relative direction angle between UE2 and UE1 through the direction of arrival of the PRS2 is only an example, and the UE1 may also determine the relative direction angle between UE2 and UE1 through other information sent by the UE2, such as the direction of arrival of the time difference information, speed information or speed direction information.

Based on the above method, when the UE1 determines the position information of the UE2 relative to it, there is no need to interact with base stations, simplifying the positioning process.

Embodiment 2: A positioning system composed of UE1 and UE2 connected based on sidelink.

Embodiment 2 is the terminal-to-terminal relative position measurement based on the time synchronization. In this embodiment, the UE1 and UE2 are time synchronized. For example, the UE1 and UE2 are both synchronized with a Global Navigation Satellite System (GNSS) signal to achieve the time synchronization between UE1 and UE2. It should be understood that the higher the accuracy of time synchronization, the higher the positioning accuracy. For example, the accuracy of time synchronization is millisecond or microsecond, etc.

Figure 9:
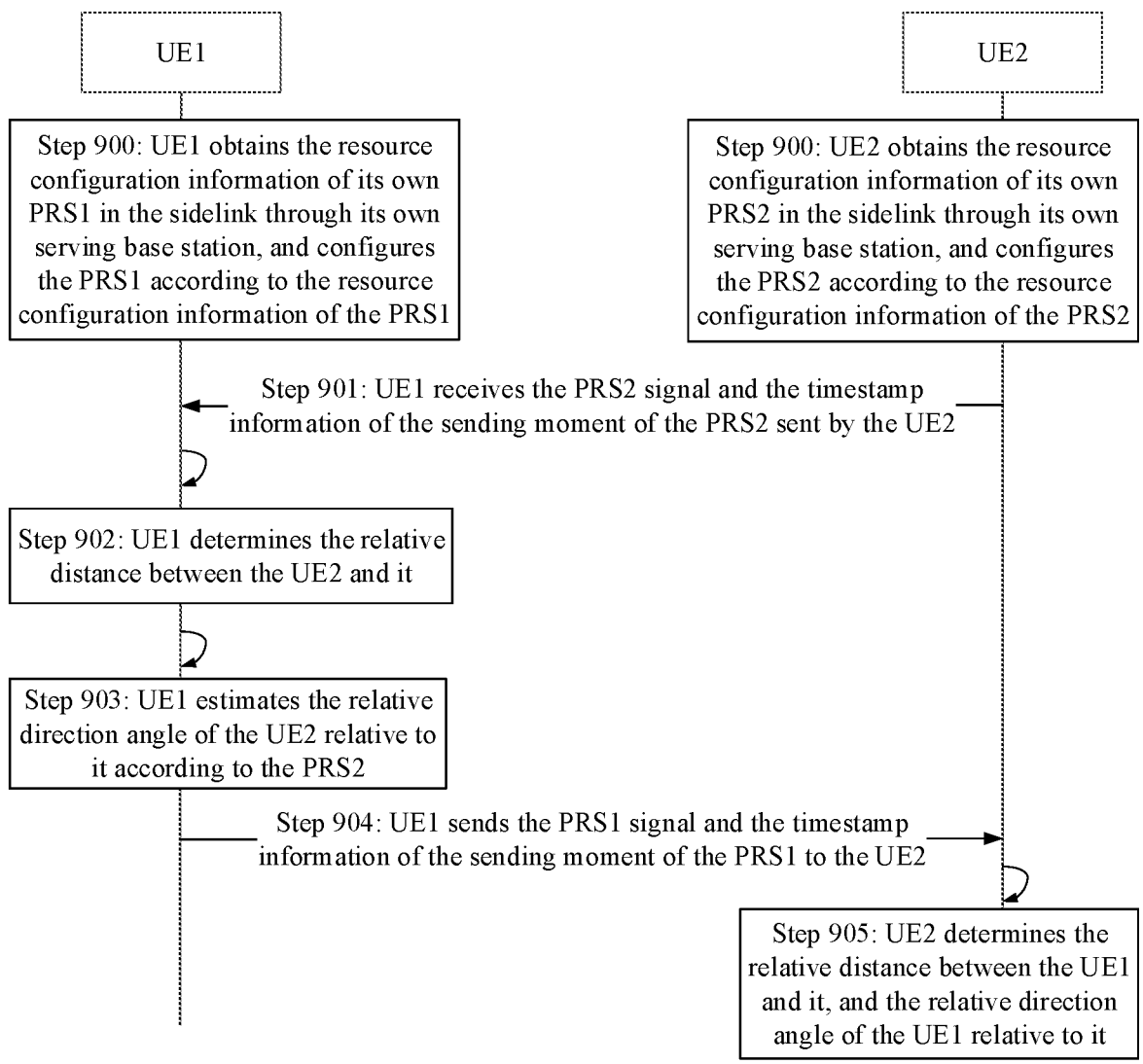
FIG. 9 is a schematic diagram of an interaction process for positioning in Embodiment 2 of the present application.

As shown in FIG. 9, it is a schematic diagram of the interaction process of Embodiment 2 provided in the present application. The Embodiment 2 can be applied to the application scenario shown in FIG. 4, and includes the following steps.

Step 900: each terminal obtains the resource configuration information of its own PRS in the sidelink through a base station.

The execution flow of step 900 can refer to the specific operation steps of step 600, which will not be repeated here.

Step 901: the UE1 receives a PRS2 and the sending time information sent by the UE2.

The PRS2 in this embodiment and the PRS2 in Embodiment 1 do not refer to the same signal in the same process, but refer to the sidelink-based PRS corresponding to the UE2. The PRS2 in different embodiments may be understood as the above statement, and similarly, the PRS1 in each embodiment may refer to the description of the PRS2, which will not be repeated here.

The UE2 sends the PRS2 to the UE1, and the timestamp of the moment of sending the PRS2 is recorded as T3. Correspondingly, the UE1 receives the PRS2, and the timestamp of the moment of receiving the PRS2 is recorded as T4.

The UE2 sends the timestamp information of the sending time corresponding to T3 to the UE1, and the timestamp information may be sent together with or after the PRS2. If sent together with the PRS2, the timestamp information and the PRS2 may be two independent data units or may be placed in the data unit of the PRS2. For example, the timestamp information of the sending time of the PRS2 is added to the data unit carrying the PRS2.

Step 902: the UE1 determines the relative distance between the UE2 and it.

Exemplarily, the UE1 may determine the relative distance between the UE2 and it in the determining way in step 605 described above.

As another example, the UE1 may also determine the relative distance between UE2 and it according to the duration of transmitting the PRS2. The relative distance D between UE1 and UE2 satisfies:

$$D = |T4 - T3| \times C_{light} \quad \text{(Formula 7).}$$

Step 903: the UE1 estimates the direction angle of the UE2 relative to it according to the PRS2.

The execution flow of step 903 can refer to the specific operation steps of step 606, which will not be repeated here.

In one embodiment, as shown in step 904, the UE1 may also send the PRS1 and the timestamp information of the sending moment of the PRS1 to the UE2; and the UE2 determines the distance from the UE1 according to the timestamp information of the moment at which the UE1 sends the PRS1 and the timestamp information of the moment of receiving the PRS1, and estimates the azimuth angle of the UE1 relative to the UE2 according to the PRS1 sent by the UE1, referring to step 905. For the step 905, the process implemented by the UE2 can refer to the specific execution steps of the steps 902 and 903 on the UE1 side, which will not be repeated here.

In one implementation, the first time and the third time introduced in the step 601 and step 602 in Embodiment 1 may be preset times, that is, times known in advance by both the UE1 and UE2.

For example, before sending the PRS1, the UE1 notifies the UE2 of the time (first time) when the UE1 sends the PRS1 to the UE2. When the first time is reached, the UE1 sends the PRS1 to the UE2; before sending the PRS2, the UE2 notifies the UE1 of the time (third time) to send the PRS2. When the third time is reached, the UE2 sends the PRS2 to the UE1. As another example, assuming that the first time is slot m of each radio frame and the third time is slot n of each radio frame (slot n is located after slot m), then the UE1 sends the PRS1 to the UE2 in slot m of the current radio frame. After receiving the PRS1, the UE2 sends the PRS2 to the UE1 in slot n.

If the above method is applied in Embodiment 1, after the UE2 receives the PRS1 sent by the UE1, since the UE2 knows that the time when the UE1 sends the PRS1 is the preset first time (T1), the UE2 can directly determine the relative position information of the UE1 relative to it according to the time (T2) when the UE2 receives the PRS1 actually and the preset first time, referring to Formula 7 above; and similarly, after receiving the PRS2 sent by the UE2, the UE1 can also directly determine the relative position information of the UE2 relative to it according to the preset third time and the time when the UE1 receives the PRS2 actually.

If the above method is applied in Embodiment 2, the UE2 sends the PRS2 to the UE1 at a preset sending moment, so the UE2 does not need to report the timestamp information of the sending moment of the PRS2 to the UE1, and the UE1 determines the relative position information of the UE2 relative to the UE1 itself according to the preset sending moment and the moment of receiving the PRS2.

The above two embodiments are manners in which the terminal performs positioning based on the sidelink positioning reference signal. In the above manners, the terminal may also combine the network-assisted positioning manner with the above two manners to improve the positioning accuracy, which will be introduced below in detail through Embodiment 3.

Embodiment 3: A positioning system composed of UE1, UE2 and a network-side device (such as a base station).

Figure 10:
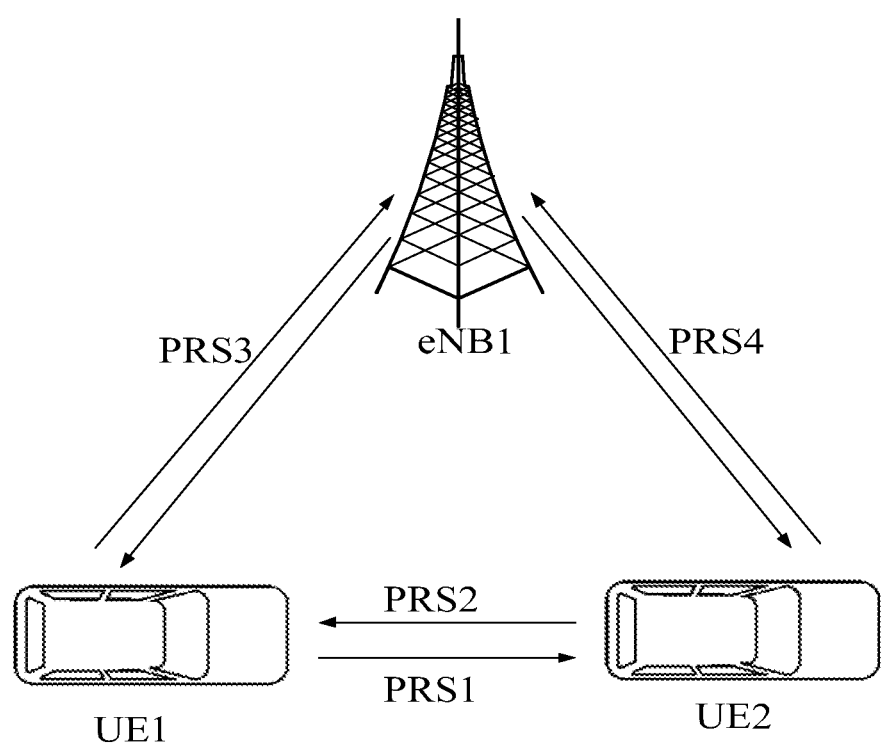
FIG. 10 is a schematic diagram of another application scenario according to an embodiment of the present application.

Embodiment 3 is the vehicle-to-vehicle relative position measurement with the assistance of network. As shown in FIG. 10, it is a scenario to which the Embodiment 3 may be applicable according to the present application, where there is a sidelink connection between UE1 and UE2, the UE1 and the network-side device are connected via an air interface, and the UE2 and the network-side device are also connected via an air interface. On the one hand, the UE1 and UE2 can perform positioning in the manner of the above-mentioned Embodiment 1 and/or Embodiment 2, and on the other hand, they can also perform positioning with the assistance of the network-side device.

Figure 11:
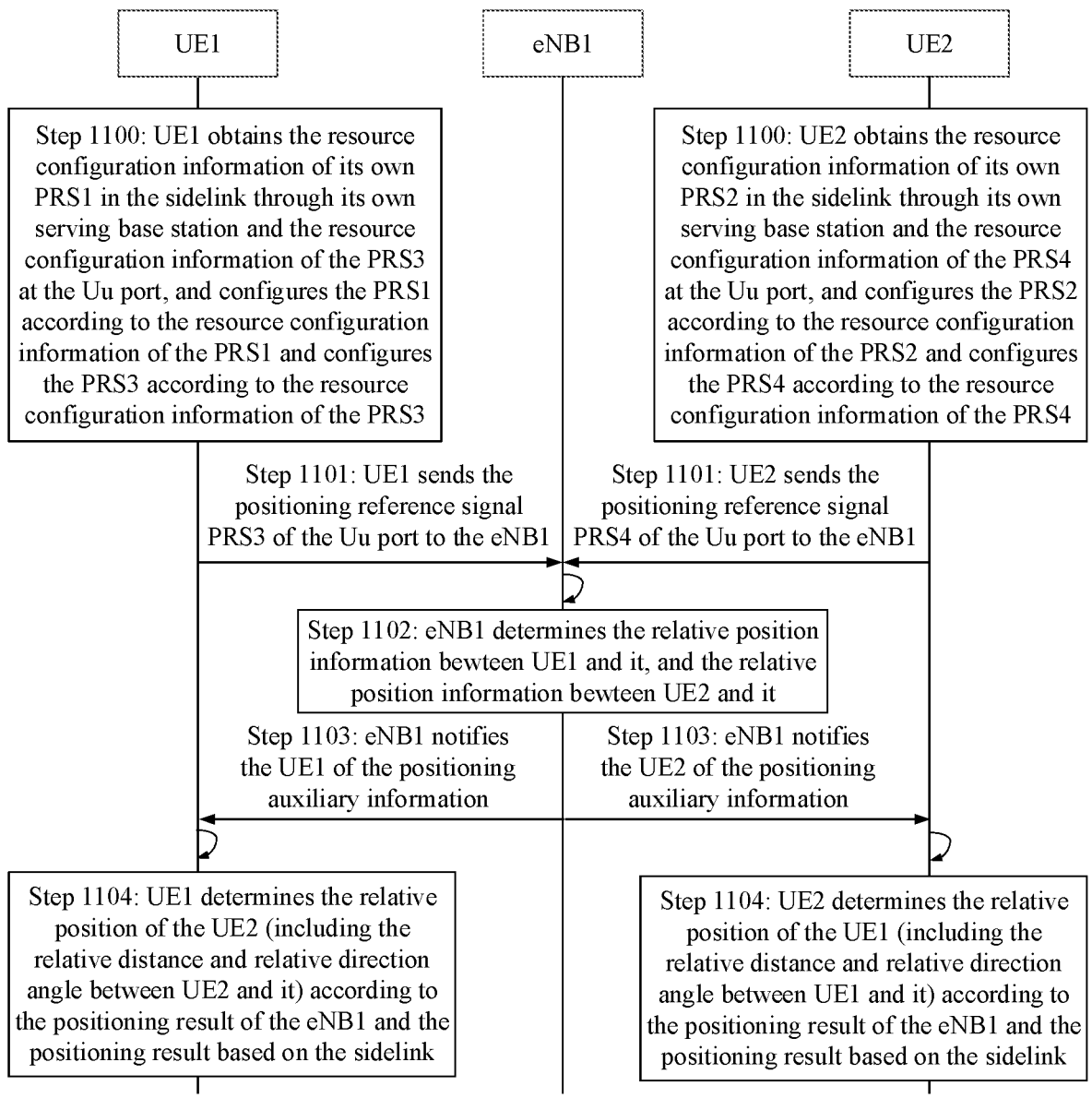
FIG. 11 is a schematic diagram of an interaction process for positioning in Embodiment 3 of the present application.

As shown in FIG. 11, it is a schematic diagram of the interaction process of Embodiment 3 provided in the present application. The Embodiment 3 can be applied to the application scenario shown in FIG. 10, and includes the following steps.

Step 1100: each terminal obtains the resource configuration information of its own PRS in the sidelink through a base station, and obtains the resource configuration information of its own PRS at the Uu port through the base station.

Step 1101: the UE1 sends a positioning reference signal PRS3 of the Uu port to the eNB1, and the UE2 sends a positioning reference signal PRS4 of the Uu port to the eNB1.

The UE1 obtains the resource configuration information of its own positioning reference signal PRS3 at the Uu port through the eNB1, and configures the PRS3 signal according to the resource configuration information of the PRS3. The UE2 obtains the resource configuration information of its own positioning reference signal PRS4 at the Uu port through the eNB1, and configures the PRS4 signal according to the resource configuration information of the PRS4.

Here, the time when the UE1 sends the PRS1 to the eNB1 may be the same as the time when the UE2 sends the PRS2 to the eNB1, or the time difference between them may be within a threshold range. If they are sent at the same time, they may be sent at the preset sending time. For example, the eNB1 informs the UE1 and UE2 to send the positioning reference signals in a same slot, or the UE1 and UE2 exchange the time information to determine the time to send the positioning reference signals.

When this step 1101 is performed, the UE1 and UE2 may perform the steps in the foregoing Embodiment 1 or the steps in the foregoing Embodiment 2 to obtain a sidelink-based positioning result.

Step 1102: the eNB1 determines the relative position between UE1 and it, and the relative position between UE2 and it.

The eNB1 determines the relative distance and direction angle between UE1 and it according to the PRS1. Similarly, the eNB1 determines the relative distance and direction angle between UE2 and it according to the PRS2. The determining mode can refer to the relevant execution steps in the foregoing Embodiment 1 or Embodiment 2, and will not be repeated here.

Step 1103: the eNB1 notifies the UE1 and UE2 of the positioning auxiliary information respectively.

In this embodiment, the positioning auxiliary information includes the relative distance and relative direction angle between UE2 and eNB1, the relative distance and relative direction angle between UE1 and eNB1, and the position information of the eNB1 itself.

The UE1 calculates the relative position between UE2 and it according to the positioning auxiliary information notified by the eNB1; and similarly, the UE2 calculates the relative position between UE1 and it according to the positioning auxiliary information notified by the eNB1.

In an example, assuming that the positioning auxiliary information sent by the eNB1 includes the position information of eNB1 itself, for example: the eNB1 is located at coordinates (0, 0) in the map coordinate system, the relative position of the UE1 relative to the eNB1 is coordinates (0, 10), and the relative position of the UE2 relative to the eNB1 is coordinates (0, 20), then the UE1 can infer the relative position of the UE2 relative to the UE1 itself according to the above information.

In one embodiment, the eNB1 may also directly determine the absolute positions of the two terminals and send the absolute position information of the two terminals to the UE1 and UE2, and the UE1 and UE2 determine the relative distance and the relative direction angle according to the obtained absolute position information to infer the relative position information. The UE1 determines the relative distance and relative direction angle between the UE2 and UE1 according to its own absolute position and the absolute position of the UE2, and determines the position information of the UE2 relative to the UE1 according to the determined relative distance and relative direction angle.

In one embodiment, the eNB1 may also directly notify the UE1 and UE2 of the relative position information between the two terminals, that is, the eNB1 determines the relative distance and direction angle between the UE1 and UE2, and then sends the determined information such as the relative distance and direction angle of the UE2 relative to the UE1 to the UE1. Similarly, the eNB1 may also send the determined information such as the distance and direction angle of the UE1 relative to the UE2 to the UE2.

In a possible scenario, the UE1 and UE2 may not be connected to the same serving base station. For example, the base station connected to the UE1 is eNB1, and the base station connected to the UE2 is eNB2. The UE1 and UE2 exchange information with their respective servers in steps 1100 and 1101. For example, the UE1 sends a PRS3 signal to the eNB1 and the UE2 sends a PRS4 signal to the eNB2 in step 1101. The eNB1 determines the relative position of the UE1 relative to the eNB1 according to the PRS3. The eNB2 determines the relative position of the UE2 relative to the eNB2 according to the PRS4. The eNB1 and eNB2 perform mutual positioning, and the eNB1 and eNB2 exchange the positioning results of the terminals with each other to obtain the positioning information of each other's access terminal and the relative position information between the two base stations. For example, the eNB1 sends the relative position between the eNB1's access terminal and itself as well as the position information of the eNB1 relative to the eNB2 to the eNB2, and the eNB2 sends the relative position between the eNB2's access terminal and itself as well as the position information of the eNB2 relative to the eNB1 to the eNB1, and the eNB1 can calculate the relative position of the access terminal under the eNB2 relative to the eNB1 and notify the UE1 of the determined relative position information of each terminal and the position information of the eNB1 itself. Similarly, the eNB2 may also execute the method flow of the eNB1 to notify the UE2, which will not be repeated here.

It should be noted that the above only takes the communication system composed of two terminals and eNB1 as an example to describe the method of Embodiment 3. In an implementation, the eNB1 may notify any terminal of the determined position information of all terminals, to enable the terminal to determine its relative positions to other terminals.

Step 1104: the UE1 determines the relative position of the UE2 according to the positioning result of the eNB1 and the positioning result based on the sidelink.

The UE1 calculates the position of the UE2 relative to the UE1 itself according to the positioning result of the eNB1, and determines the relative position of the UE2 based on the position of the UE2 relative to the UE1 itself determined by itself in the manner of Embodiment 1 or Embodiment 2, and to improve the positioning precision of the UE2.

Here, there are many manners in which the UE1 determines the final position information of the UE2 relative to the UE1 itself according to the position information of the UE2 and UE itself determined by the positioning auxiliary information of the network-side device as well as the position information of the UE2 and UE1 itself determined in the manner of Embodiment 1 and/or Embodiment 2. Several will be listed below.

1) Determine the final position information according to the signal strength of the sidelink and the signal strength of the Uu port signal.

The signal strength of the signal of the sidelink is compared with that of the Uu port signal to select the final positioning result. For example, if the signal of the sidelink is relatively strong, it can be understood that the reliability of positioning based on the signal of the sidelink is relatively high. Then the UE1 may use the relative position of the UE2 determined based on the signal of the sidelink as the final relative position of the UE2 to the UE1 itself, that is, the UE1 determines the position information of the UE2 relative to the UE1 in the manner of Embodiment 1 or Embodiment 2. If the Uu port signal is relatively strong, it can be understood that the reliability of positioning based on the Uu port signal is relatively high. Then the UE1 may use the relative position of the UE2 determined based on the Uu port signal as the relative position of the UE2 to the UE1 itself, that is, the UE1 determines the position information of the UE2 relative to the UE1 based on the positioning auxiliary information notified by the network-side device.

2) Determine according to the positioning result based on the sidelink and the positioning result based on the base station.

For example, the distance of the UE2 relative to the UE1 determined by the UE1 based on the sidelink is 10 m, and the azimuth angle is 60; the distance of the UE2 relative to the UE1 obtained by the UE1 according to the eNB1 is 11 m, and the azimuth angle is 61. Then the UE1 may perform the weighted calculation based on the two results to determine the final relative position of the UE2 relative to the UE1. For example, the UE1 determines that the final relative distance of the UE2 relative to the UE1 is 10.5 m and the azimuth angle is 60.5.

Embodiment 4: A positioning system composed of UE1, UE2 and a network-side device (such as a base station).

Figure 12:
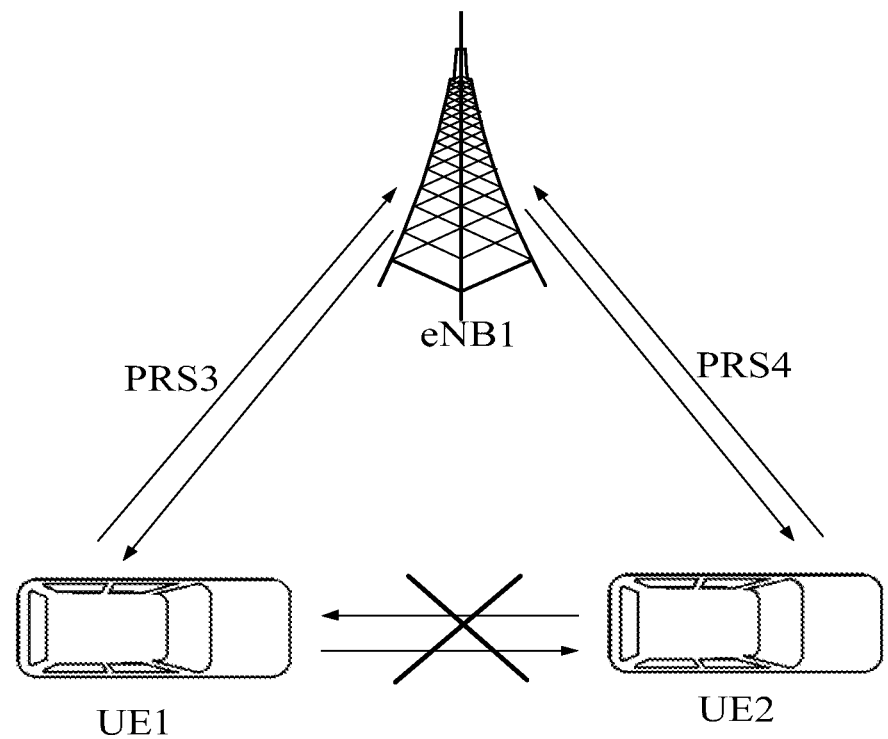
FIG. 12 is a schematic diagram of a third application scenario according to an embodiment of the present application.

Embodiment 4 is a method of positioning based entirely on the network device. In a possible scenario, as shown in FIG. 12, when there is no direct communication link between the UE1 and UE2, the UE1 and UE2 may adopt the method of positioning through eNB1 in Embodiment 3 described above, for example, including the following steps.

1. Each terminal obtains the resource configuration information of its own PRS at the Uu port through its own serving base station.
2. The UE1 sends a positioning reference signal PRS3 of the Uu port to the eNB1, and the UE2 sends a positioning reference signal PRS4 of the Uu port to the eNB1.
3. The eNB1 determines the relative position between UE1 and it, and the relative position between UE2 and it.
4. The eNB1 notifies the UE1 and UE2 of the positioning result and its own position information.
5. The UE1 determines the relative position of the UE2 (relative to the UE1) according to the positioning result of the eNB1.

In one embodiment, the UE2 may also determine the relative position of the UE1 relative to the UE2 itself according to the positioning result of the eNB1.

Here, for the implementation process of the above steps, the reference may be made to the relevant execution steps in Embodiment 3, which will not be repeated here.

Based on the same inventive concept, an embodiment of the disclosure further provides a first terminal for positioning. Since this terminal is the first terminal in a positioning system in the embodiments of the disclosure and the principle of this terminal to solve the problem is similar to that of the method of the first terminal in the system, the implementations of this terminal can refer to the implementations of the first terminal in the system, and the repeated description thereof will be omitted.

Figure 13:
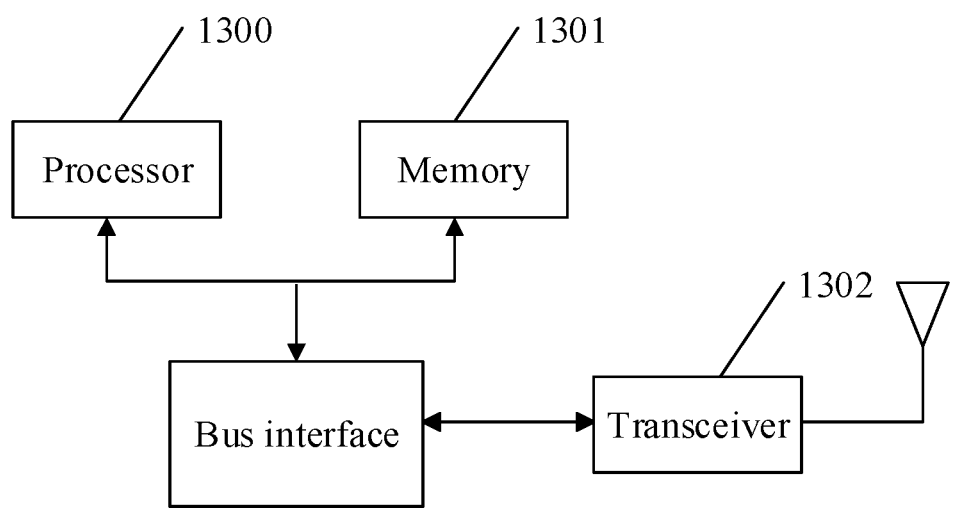
FIG. 13 is a structural schematic diagram of a first terminal for positioning according to an embodiment of the disclosure.

As shown in FIG. 13, an embodiment of the disclosure provides a first terminal for positioning, including: a processor 1300, a memory 1301 and a transceiver 1302.

The processor 1300 is responsible for managing the bus architecture and general processing, and the memory 1301 may store the data used by the processor 1300 when performing the operations. The transceiver 1302 is configured to receive and send the data under the control of the processor 1300.

The bus architecture may include any numbers of interconnected buses and bridges, and specifically link various circuits of one or more processors represented by the processor 1300 and the memory represented by the memory 1301. The bus architecture may further link various other circuits such as peripheral device, voltage regulator and power management circuit, which are all well known in the art and thus will not be further described again herein. The bus interface provides an interface. The processor 1300 is responsible for managing the bus architecture and general processing, and the memory 1301 may store the data used by the processor 1300 when performing the operations.

The procedure disclosed by the embodiment of the disclosure may be applied in the processor 1300 or implemented by the processor 1300. In the implementation process, each step of the signal processing flow may be completed by the integrated logic circuit of hardware in the processor 1300 or the instruction in the form of software. The processor 1300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1301, and the processor 1300 reads the information in the memory 1301 and completes the steps of the signal processing flow in combination with its hardware.

In one embodiment, the processor 1300 is configured to read programs in the memory 1301 to:
obtain the positioning auxiliary information via the transceiver 1302;
determine the position information of a second terminal relative to the first terminal according to the obtained positioning auxiliary information.

In one embodiment, the processor 1300 is configured to:
obtain the timestamp information of a sending moment of a first positioning signal by sending the first positioning signal to the second terminal;
obtain the timestamp information of a receiving moment of a second positioning signal by receiving the second positioning signal sent by the second terminal, and receive the time difference information sent by the second terminal; where the time difference information is used to indicate a time difference between time when the second terminal receives the first positioning signal and time when the second terminal sends the second positioning signal;
determine a relative distance between the second terminal and the first terminal according to the timestamp information of the sending moment of the first positioning signal, the timestamp information of the receiving moment of the second positioning signal and the time difference information; and determine a relative position between the second terminal and the first terminal according to the relative distance between the second terminal and the first terminal.

In one embodiment, the positioning auxiliary information further includes the speed information and speed direction information of the second terminal; and the processor 1300 is configured to:
determine a relative distance between the second terminal and the first terminal according to the speed information of the first terminal, the speed direction information of the first terminal, the speed information of the second terminal, the speed direction information of the second terminal, the timestamp information of the sending moment of the first positioning signal, the timestamp information of the receiving moment of the second positioning signal and the time difference information; and determine a relative position between the second terminal and the first terminal according to the relative distance between the second terminal and the first terminal.

In one embodiment, the processor 1300 is configured to:
obtain the receiving time of a second positioning signal by receiving the second positioning signal sent by the second terminal, and receive the timestamp information of a sending moment of the second positioning signal;
determine a relative distance between the second terminal and the first terminal according to timestamp information of a receiving moment of the second positioning signal and the timestamp information of the sending moment of the second positioning signal; and determine a relative position between the second terminal and the first terminal according to the relative distance between the second terminal and the first terminal.

In one embodiment, the processor 1300 is configured to:
determine the relative position between the second terminal and the first terminal according to an Angle of Arrival of the second positioning signal and the relative distance of the second terminal relative to the first terminal.

In one embodiment, the processor 1300 is specifically configured to: obtain the positioning auxiliary information sent by a network-side device;
the positioning auxiliary information includes: the position information of the first terminal relative to the network-side device, the position information of the second terminal relative to the network-side device, and the position information of the network-side device itself; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In one embodiment, the processor 1300 is configured to:
obtain the positioning auxiliary information sent by a network-side device; where the positioning auxiliary information further includes: the position information of the first terminal relative to the network-side device, the position information of the second terminal relative to the network-side device, and the position information of the network-side device itself; and the network-side device obtains the position information of the first terminal relative to the network-side device through a third positioning signal sent by the first terminal, and obtains the position information of the second terminal relative to the network-side device through a four positioning signal sent by the second terminal.

In one embodiment, the processor 1300 is configured to:
obtain positioning auxiliary information sent by a network-side device;
the positioning auxiliary information includes: the absolute position information of the first terminal and the absolute position information of the second terminal;

where the absolute position information of the first terminal is obtained by the network-side device through a third positioning signal sent by the first terminal, and the absolute position information of the second terminal is obtained by the network-side device through a fourth positioning signal sent by the second terminal.

Figure 14:
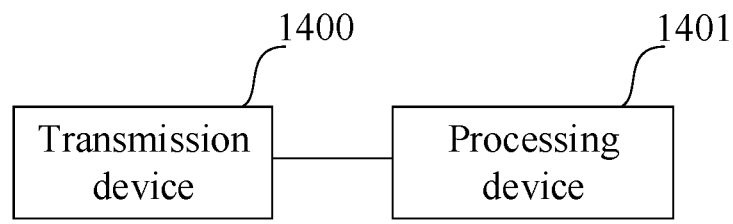
FIG. 14 is a structural schematic diagram of another first terminal for positioning according to an embodiment of the disclosure.

Based on the same concept, as shown in FIG. 14, an embodiment of the disclosure provides another first terminal for positioning, including:

a transmission device 1400 configured to obtain the positioning auxiliary information;

a processing device 1401 configured to determine the position information of a second terminal relative to the first terminal according to the obtained positioning auxiliary information.

In one embodiment, the transmission device 1400 is configured to:

obtain the timestamp information of a sending moment of a first positioning signal by sending the first positioning signal to the second terminal; obtain the timestamp information of a receiving moment of a second positioning signal by receiving the second positioning signal sent by the second terminal, and receive the time difference information sent by the second terminal; where the time difference information is used to indicate a time difference between time when the second terminal receives the first positioning signal and time when the second terminal sends the second positioning signal;

the processing device 1401 is specifically configured to:

determine a relative distance between the second terminal and the first terminal according to the timestamp information of the sending moment of the first positioning signal, the timestamp information of the receiving moment of the second positioning signal and the time difference information; and determine a relative position between the second terminal and the first terminal according to the relative distance between the second terminal and the first terminal.

In one embodiment, the positioning auxiliary information further includes the speed information and speed direction information of the second terminal;

the processing device 1401 is configured to:

determine a relative distance between the second terminal and the first terminal according to the speed information of the first terminal, the speed direction information of the first terminal, the speed information of the second terminal, the speed direction information of the second terminal, the timestamp information of the sending moment of the first positioning signal, the timestamp information of the receiving moment of the second positioning signal and the time difference information; and determine a relative position between the second terminal and the first terminal according to the relative distance between the second terminal and the first terminal.

In one embodiment, the transmission device 1400 is configured to:

obtain the receiving time of a second positioning signal by receiving the second positioning signal sent by the second terminal, and receive the timestamp information of a sending moment of the second positioning signal;

the processing device 1401 is configured to:

determine a relative distance between the second terminal and the first terminal according to timestamp information of a receiving moment of the second positioning signal and the timestamp information of the sending moment of the second positioning signal; and determine a relative position between the second terminal and the first terminal according to the relative distance between the second terminal and the first terminal.

In one embodiment, the processing device 1401 is configured to:

determine the relative position between the second terminal and the first terminal according to an Angle of Arrival of the second positioning signal and the relative distance of the second terminal relative to the first terminal.

In one embodiment, the transmission device 1400 is configured to: obtain the positioning auxiliary information sent by a network-side device;

the positioning auxiliary information includes: the position information of the first terminal relative to the network-side device, the position information of the second terminal relative to the network-side device, and the position information of the network-side device itself; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In one embodiment, the transmission device 1400 is configured to: obtain the positioning auxiliary information sent by a network-side device;

the positioning auxiliary information further includes: the position information of the first terminal relative to the network-side device, the position information of the second terminal relative to the network-side device, and the position information of the network-side device itself; and the network-side device obtains the position information of the first terminal relative to the network-side device through a third positioning signal sent by the first terminal, and obtains the position information of the second terminal relative to the network-side device through a four positioning signal sent by the second terminal.

In one embodiment, the transmission device 1400 is further configured to:

obtain the positioning auxiliary information sent by a network-side device;

the positioning auxiliary information includes: the position information of the first terminal relative to the network-side device, the position information of the second terminal relative to the network-side device, and the position information of the network-side device itself; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

Based on the same inventive concept, an embodiment of the disclosure further provides a second terminal for positioning. Since this terminal is the peer device in a positioning system in the embodiments of the disclosure and the principle of this terminal to solve the problem is similar to that of the method of the peer device in the system, the implementations of this terminal can refer to the implementations of the peer device in the system, and the repeated description thereof will be omitted.

Figure 15:
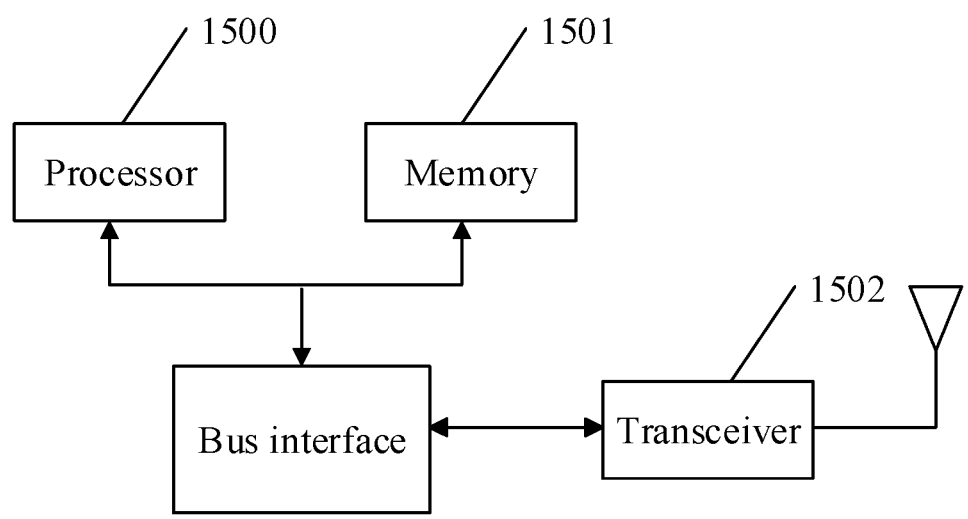
FIG. 15 is a structural schematic diagram of a second terminal for positioning according to an embodiment of the disclosure.

As shown in FIG. 15, an embodiment of the disclosure provides a second terminal for positioning, including a processor 1500, a memory 1501 and a transceiver 1502.

The processor 1500 is responsible for managing the bus architecture and general processing, and the memory 1501 may store the data used by the processor 1500 when performing the operations. The transceiver 1502 is configured to receive and send the data under the control of the processor 1500.

The bus architecture may include any numbers of interconnected buses and bridges, and specifically link various circuits of one or more processors represented by the processor 1500 and the memory represented by the memory 1501. The bus architecture may further link various other circuits such as peripheral device, voltage regulator and power management circuit, which are all well known in the art and thus will not be further described again herein. The bus interface provides an interface. The processor 1500 is responsible for managing the bus architecture and general processing, and the memory 1501 may store the data used by the processor 1500 when performing the operations.

The procedure disclosed by the embodiment of the disclosure may be applied in the processor 1500 or implemented by the processor 1500. In the implementation process, each step of the signal processing flow may be completed by the integrated logic circuit of hardware in the processor 1500 or the instruction in the form of software. The processor 1500 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1501, and the processor 1500 reads the information in the memory 1501 and completes the steps of the signal processing flow in combination with its hardware.

In one embodiment, the processor 1500 is configured to read programs in the memory 1501 to:
send the positioning auxiliary information to a first terminal via the transceiver 1502, and the first terminal determines the position information relative to the first terminal according to the positioning auxiliary information.

In one embodiment, the processor 1500 is configured to: send a second positioning signal and the time difference information to the first terminal after receiving a first positioning signal sent by the first terminal; where the time difference information is used to indicate a time difference between time when the second terminal receives the first positioning signal and time when the second terminal sends the second positioning signal.

In one embodiment, the positioning auxiliary information of the first terminal includes information on time when the first terminal sends the positioning auxiliary information.

In one embodiment, the processor 1500 is further configured to: send the speed information and speed direction information of the second terminal to the first terminal.

In one embodiment, the processor 1500 is further configured to: send a second positioning signal and the timestamp information of a sending moment of the second positioning signal to the first terminal.

In one embodiment, the processor 1500 is further configured to: send a third positioning signal to a network-side device, and the network-side device determines the position information of the second terminal relative to the network-side device or the absolute position information of the second terminal according to the third positioning signal.

Figure 16:
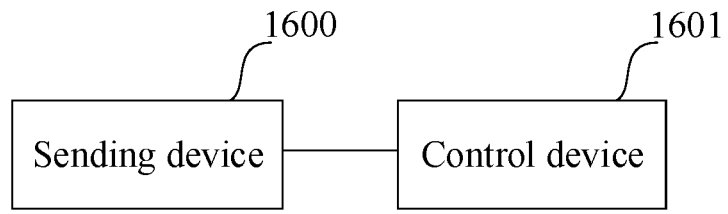
FIG. 16 is a structural schematic diagram of another second terminal for positioning according to an embodiment of the disclosure.

Based on the same concept, as shown in FIG. 16, an embodiment of the disclosure provides another second terminal for positioning, including:
a sending device 1600 configured to send the positioning auxiliary information to a first terminal and the first terminal determines the position information relative to the first terminal according to the positioning auxiliary information.
a control device 1601 configured to control the sending device to send the positioning auxiliary information to the first terminal.

In one embodiment, the sending device 1600 is configured to: send a second positioning signal and the time difference information to the first terminal after receiving a first positioning signal sent by the first terminal; where the time difference information is used to indicate a time difference between time when the second terminal receives the first positioning signal and time when the second terminal sends the second positioning signal.

In one embodiment, the sending device 1600 is further configured to: send the speed information and speed direction information of the second terminal to the first terminal.

In one embodiment, the sending device 1600 is further configured to: send a second positioning signal and the timestamp information of a sending moment of the second positioning signal to the first terminal.

In one embodiment, the sending device 1600 is further configured to: send a third positioning signal to a network-side device, and the network-side device determines the position information of the second terminal relative to the network-side device or the absolute position information of the second terminal according to the third positioning signal.

Based on the same inventive concept, an embodiment of the disclosure further provides a network-side device for positioning. Since this network-side device is the network side in a positioning system in the embodiments of the disclosure and the principle of this network-side device to solve the problem is similar to that of the method of the network-side device in the system, the implementations of this network-side device can refer to the implementations of the network-side device in the system, and the repeated description thereof will be omitted.

Figure 17:
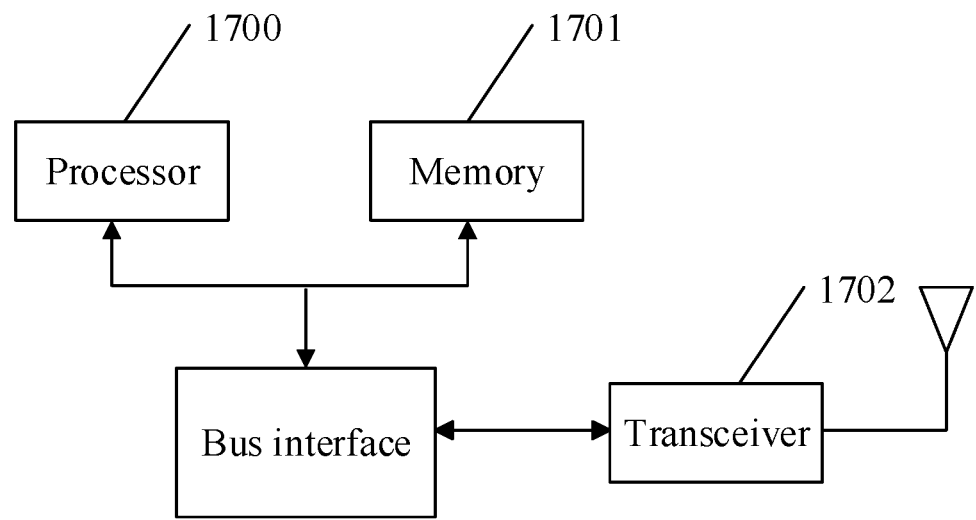
FIG. 17 is a structural schematic diagram of a network-side device for positioning according to an embodiment of the disclosure.

As shown in FIG. 17, an embodiment of the disclosure provides a network-side device for positioning, including a processor 1700, a memory 1701 and a transceiver 1702.

The processor 1700 is responsible for managing the bus architecture and general processing, and the memory 1701 may store the data used by the processor 1700 when performing the operations. The transceiver 1702 is configured to receive and send the data under the control of the processor 1700.

The bus architecture may include any numbers of interconnected buses and bridges, and specifically link various circuits of one or more processors represented by the processor 1700 and the memory represented by the memory 1701. The bus architecture may further link various other circuits such as peripheral device, voltage regulator and power management circuit, which are all well known in the art and thus will not be further described again herein. The bus interface provides an interface. The processor 1700 is responsible for managing the bus architecture and general processing, and the memory 1701 may store the data used by the processor 1700 when performing the operations.

The procedure disclosed by the embodiment of the disclosure may be applied in the processor 1700 or implemented by the processor 1700. In the implementation process, each step of the signal processing flow may be completed by the integrated logic circuit of hardware in the processor 1700 or the instruction in the form of software. The processor 1700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software devices may be located in the random access memory, flash memory, read only memory, programmable read only memory or electrically erasable programmable read only memory, register and other mature storage medium in the art. The storage medium is located in the memory 1701, and the processor 1700 reads the information in the memory 1701 and completes the steps of the signal processing flow in combination with its hardware.

In one embodiment, the processor 1700 is configured to read programs in the memory 1701 to:
receive a third positioning signal sent by a first terminal and a fourth positioning signal sent by a second terminal;
send the positioning auxiliary information to the first terminal.

In one embodiment, the positioning auxiliary information includes: the position information of the first terminal relative to the network-side device, the position information of the second terminal relative to the network-side device, and the position information of the network-side device itself; and the network-side device obtains the position information of the first terminal relative to the network-side device through the third positioning signal sent by the first terminal, and obtains the position information of the second terminal relative to the network-side device through the four positioning signal sent by the second terminal.

In one embodiment, the positioning auxiliary information includes: the absolute position information of the first terminal and the absolute position information of the second terminal; where the absolute position information of the first terminal is obtained by the network-side device through the third positioning signal sent by the first terminal, and the absolute position information of the second terminal is obtained by the network-side device through the fourth positioning signal sent by the second terminal.

Figure 18:
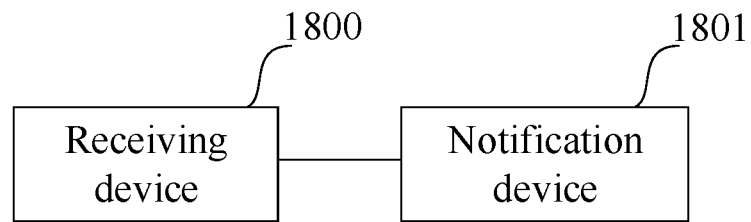
FIG. 18 is a structural schematic diagram of another network-side device for positioning according to an embodiment of the disclosure.

Based on the same concept, as shown in FIG. 18, an embodiment of the disclosure provides another network-side device for positioning, including:

a receiving device 1800 configured to receive a third positioning signal sent by a first terminal and a fourth positioning signal sent by a second terminal;
a notification device 1801 configured to send the positioning auxiliary information to the first terminal.

In one embodiment, the positioning auxiliary information includes: the position information of the first terminal relative to the network-side device, the position information of the second terminal relative to the network-side device, and the position information of the network-side device itself; and the network-side device obtains the position information of the first terminal relative to the network-side device through the third positioning signal sent by the first terminal, and obtains the position information of the second terminal relative to the network-side device through the four positioning signal sent by the second terminal.

In one embodiment, the positioning auxiliary information includes: the absolute position information of the first terminal and the absolute position information of the second terminal; where the absolute position information of the first terminal is obtained by the network-side device through the third positioning signal sent by the first terminal, and the absolute position information of the second terminal is obtained by the network-side device through the fourth positioning signal sent by the second terminal.

Based on the same inventive concept, an embodiment of the present application further provides a positioning method. Since this method corresponds to the method corresponding to the first terminal in a positioning system in the embodiments of the disclosure and the principle of this method to solve the problem is similar to that of the device, the implementations of this method can refer to the implementations of the device, and the repeated description thereof will be omitted.

Figure 19:
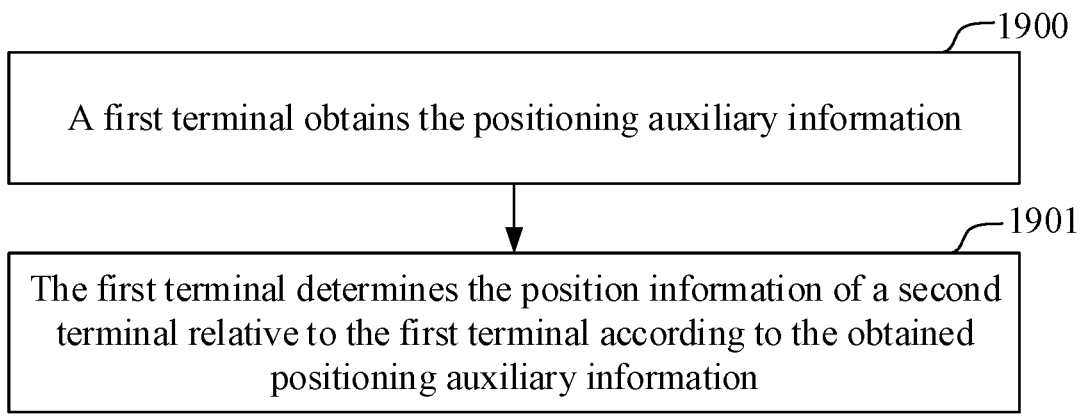
FIG. 19 is a schematic flowchart of a positioning method corresponding to a first terminal according to an embodiment of the disclosure.

As shown in FIG. 19, it is a flowchart of a positioning method according to an embodiment of the disclosure, which specifically includes the following steps:
Step 1900: a first terminal obtains the positioning auxiliary information;
Step 1901: the first terminal determines the position information of a second terminal relative to the first terminal according to the obtained positioning auxiliary information.

In one embodiment, the step in which the first terminal obtains the positioning auxiliary information includes:
the first terminal obtains the timestamp information of a sending moment of a first positioning signal by sending the first positioning signal to the second terminal;
the first terminal obtains the timestamp information of a receiving moment of a second positioning signal by receiving the second positioning signal sent by the second terminal, and receives the time difference information sent by the second terminal; where the time difference information is used to indicate a time difference between time when the second terminal receives the first positioning signal and time when the second terminal sends the second positioning signal;
the step in which the first terminal determines the position information of a second terminal relative to the first terminal according to the obtained positioning auxiliary information, includes: the first terminal determines a relative distance between the second terminal and the first terminal according to the timestamp information of the sending moment of the first positioning signal, the timestamp information of the receiving moment of the second positioning signal and the time difference information; and determines a relative position between the second terminal and the first terminal according to the relative distance between the second terminal and the first terminal.

In one embodiment, the positioning auxiliary information further includes the speed information and speed direction information of the second terminal;

the step in which the first terminal determines the position information of a second terminal relative to the first terminal according to the obtained positioning auxiliary information, includes:

the first terminal determines a relative distance between the second terminal and the first terminal according to the speed information of the first terminal, the speed direction information of the first terminal, the speed information of the second terminal, the speed direction information of the second terminal, the timestamp information of the sending moment of the first positioning signal, the timestamp information of the receiving moment of the second positioning signal and the time difference information; and determines a relative position between the second terminal and the first terminal according to the relative distance between the second terminal and the first terminal.

In one embodiment, the step in which the first terminal obtains the positioning auxiliary information includes:

the first terminal obtains the receiving time of a second positioning signal by receiving the second positioning signal sent by the second terminal, and receives the timestamp information of a sending moment of the second positioning signal;

the step in which the first terminal determines the position information of a second terminal relative to the first terminal according to the obtained positioning auxiliary information, includes:

the first terminal determines a relative distance between the second terminal and the first terminal according to the timestamp information of a receiving moment of the second positioning signal and the timestamp information of the sending moment of the second positioning signal; and determines a relative position between the second terminal and the first terminal according to the relative distance between the second terminal and the first terminal.

In one embodiment, the step of determining a relative position between the second terminal and the first terminal according to the relative distance between the second terminal and the first terminal, includes:

the first terminal determines the relative position between the second terminal and the first terminal according to an Angle of Arrival of the second positioning signal and the relative distance of the second terminal relative to the first terminal.

In one embodiment, the step in which the first terminal obtains the positioning auxiliary information includes: the first terminal obtains the positioning auxiliary information sent by a network-side device;

the positioning auxiliary information includes: the position information of the first terminal relative to the network-side device, the position information of the second terminal relative to the network-side device, and the position information of the network-side device itself; where the position information of first terminal relative to the network-side device is obtained by the network-side device through a third positioning signal sent by the first terminal, and the position information of the second terminal relative to the network-side device is obtained by the network-side device through a fourth positioning signal sent by the second terminal.

In one embodiment, the step in which the first terminal obtains the positioning auxiliary information further includes:

the first terminal obtains the positioning auxiliary information sent by a network-side device; where the positioning auxiliary information further includes: the position information of the first terminal relative to the network-side device, the position information of the second terminal relative to the network-side device, and the position information of the network-side device itself; and the network-side device obtains the position information of the first terminal relative to the network-side device through a third positioning signal sent by the first terminal, and obtains the position information of the second terminal relative to the network-side device through a four positioning signal sent by the second terminal.

In one embodiment, the step in which the first terminal obtains the positioning auxiliary information includes: the first terminal obtains the positioning auxiliary information sent by a network-side device;

the positioning auxiliary information includes: the absolute position information of the first terminal and the absolute position information of the second terminal; where the absolute position information of the first terminal is obtained by the network-side device through a third positioning signal sent by the first terminal, and the absolute position information of the second terminal is obtained by the network-side device through a fourth positioning signal sent by the second terminal.

Based on the same inventive concept, an embodiment of the present application further provides a positioning method. Since this method corresponds to the method when the peer device in a positioning system is the second terminal in the embodiments of the disclosure and the principle of this method to solve the problem is similar to that of the device, the implementations of this method can refer to the implementations of the device, and the repeated description thereof will be omitted.

An embodiment of the disclosure provides a positioning method on the second terminal side, which includes the following step:

a second terminal sends the positioning auxiliary information to a first terminal and the first terminal determines the position information relative to the first terminal according to the positioning auxiliary information.

In one embodiment, the second terminal sends a second positioning signal and time difference information to the first terminal after receiving a first positioning signal sent by the first terminal; where the time difference information is used to indicate a time difference between time when the second terminal receives the first positioning signal and time when the second terminal sends the second positioning signal.

In one embodiment, the second terminal sends the speed information and speed direction information of the second terminal to the first terminal.

In one embodiment, the second terminal sends a second positioning signal and the timestamp information of a sending moment of the second positioning signal to the first terminal.

In one embodiment, the second terminal sends a third positioning signal to a network-side device, and the network-side device determines the position information of the second terminal relative to the network-side device or the absolute position information of the second terminal according to the third positioning signal.

The embodiments of the disclosure further include a computer storage medium for positioning, on which a computer program is stored. The program, when executed by a processor, implements the steps of the above method described in FIG. 17 or the steps of the above positioning method on the second terminal side.

Based on the same inventive concept, an embodiment of the present application further provides a positioning method. Since this method corresponds to the method corresponding to the network-side device in a positioning system in the embodiments of the disclosure and the principle of this method to solve the problem is similar to that of the device, the implementations of this method can refer to the implementations of the device, and the repeated description thereof will be omitted.

Figure 20:
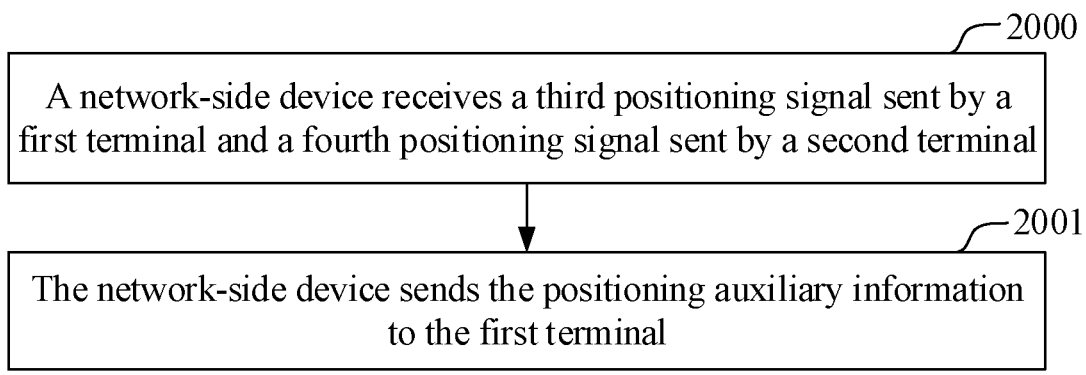
FIG. 20 is a schematic flowchart of a positioning method corresponding to a network-side device according to an embodiment of the disclosure.

As shown in FIG. 20, it is a flowchart of a positioning method according to an embodiment of the disclosure, which specifically includes the following steps:

Step 2000: a network-side device receives a third positioning signal sent by a first terminal and a fourth positioning signal sent by a second terminal;

Step 2001: the network-side device sends the positioning auxiliary information to the first terminal.

In one embodiment, the positioning auxiliary information includes: the position information of the first terminal relative to the network-side device, the position information of the second terminal relative to the network-side device, and the position information of the network-side device itself; and the network-side device obtains the position information of the first terminal relative to the network-side device through the third positioning signal sent by the first terminal, and obtains the position information of the second terminal relative to the network-side device through the four positioning signal sent by the second terminal.

In one embodiment, the positioning auxiliary information includes: the absolute position information of the first terminal and the absolute position information of the second terminal; where the absolute position information of the first terminal is obtained by the network-side device through the third positioning signal sent by the first terminal, and the absolute position information of the second terminal is obtained by the network-side device through the fourth positioning signal sent by the second terminal.

The embodiments of the disclosure further include a computer storage medium for positioning, on which a computer program is stored. The program, when executed by a processor, implements the steps of the above method described in FIG. 19, or the steps of the above method described on the second terminal side in the positioning system, or the steps of the above method described in FIG. 20.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, and the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A positioning method, comprises:
    obtaining, by a first terminal, positioning auxiliary information;
    determining, by the first terminal, position information of a second terminal relative to the first terminal according to obtained positioning auxiliary information;
    wherein the obtaining, by the first terminal, positioning auxiliary information, comprises:
    obtaining, by the first terminal, timestamp information of a sending moment of a first positioning signal by sending the first positioning signal to the second terminal;
    obtaining, by the first terminal, timestamp information of a receiving moment of a second positioning signal by receiving the second positioning signal sent by the second terminal, and receiving time difference information sent by the second terminal; wherein the time difference information is used to indicate a time difference between time when the second terminal receives the first positioning signal and time when the second terminal sends the second positioning signal;
    the determining, by the first terminal, position information of the second terminal relative to the first terminal according to the obtained positioning auxiliary information, comprises: determining, by the first terminal, a relative distance between the second terminal and the first terminal according to the timestamp information of the sending moment of the first positioning signal, the timestamp information of the receiving moment of the second positioning signal and the time difference information; and determining a relative position between the second terminal and the first terminal according to the relative distance between the second terminal and the first terminal;
    wherein the positioning auxiliary information further comprises speed information and speed direction information of the second terminal;
    the determining, by the first terminal, position information of the second terminal relative to the first terminal according to the obtained positioning auxiliary information, comprises:
    determining, by the first terminal, the relative distance between the second terminal and the first terminal according to speed information of the first terminal, speed direction information of the first terminal, the speed information of the second terminal, the speed direction information of the second terminal, the timestamp information of the sending moment of the first positioning signal, the timestamp information of the receiving moment of the second positioning signal and the time difference information; and determining the relative position between the second terminal and the first terminal according to the relative distance between the second terminal and the first terminal.

2. The method of claim 1, wherein the obtaining, by a first terminal, positioning auxiliary information, comprises:
obtaining, by the first terminal, a receiving time of a second positioning signal by receiving the second positioning signal sent by the second terminal, and receiving timestamp information of a sending moment of the second positioning signal;
the determining, by the first terminal, the position information of the second terminal relative to the first terminal according to the obtained positioning auxiliary information, comprises:
determining, by the first terminal, a relative distance between the second terminal and the first terminal according to timestamp information of a receiving moment of the second positioning signal and the timestamp information of the sending moment of the second positioning signal; and determining a relative position between the second terminal and the first terminal according to the relative distance between the second terminal and the first terminal.

3. The method of claim 1, wherein the determining the relative position between the second terminal and the first terminal according to the relative distance between the second terminal and the first terminal, comprises:
determining, by the first terminal, the relative position between the second terminal and the first terminal according to an Angle of Arrival of the second positioning signal and the relative distance of the second terminal relative to the first terminal.

4. The method of claim 1, wherein the obtaining, by the first terminal, the positioning auxiliary information, comprises: obtaining, by the first terminal, the positioning auxiliary information sent by a network-side device;
the positioning auxiliary information comprises: the position information of the first terminal relative to the network-side device, position information of the second terminal relative to the network-side device, and position information of the network-side device; wherein the position information of the first terminal relative to the network-side device is obtained by the network-side device through a third positioning signal sent by the first terminal, and the position information of the second terminal relative to the network-side device is obtained by the network-side device through a fourth positioning signal sent by the second terminal.

5. The method of claim 1, wherein the obtaining, by the first terminal, the positioning auxiliary information, further comprises:
obtaining, by the first terminal, the positioning auxiliary information sent by a network-side device; wherein the positioning auxiliary information further comprises: position information of the first terminal relative to the network-side device, position information of the second terminal relative to the network-side device, and position information of the network-side device; wherein the position information of the first terminal relative to the network-side device is obtained by the network-side device through a third positioning signal sent by the first terminal, and the position information of the second terminal relative to the network-side device is obtained by the network-side device through a fourth positioning signal sent by the second terminal.

6. The method of claim 1, wherein the obtaining, by the first terminal, the positioning auxiliary information, comprises: obtaining, by the first terminal, the positioning auxiliary information sent by a network-side device;
the positioning auxiliary information comprises: absolute position information of the first terminal and absolute position information of the second terminal; wherein the absolute position information of the first terminal is obtained by the network-side device through a third positioning signal sent by the first terminal, and the absolute position information of the second terminal is obtained by the network-side device through a fourth positioning signal sent by the second terminal.

7. A first terminal for positioning, comprises: a processor, a memory and a transceiver;
wherein the processor is configured to read programs in the memory and execute the method of claim 1.

8. A positioning method, comprises:
sending, by a second terminal, positioning auxiliary information to a first terminal, wherein the positioning auxiliary information is used for determining position information relative between the first terminal and the second terminal by the first terminal;
wherein before the second terminal sends the positioning auxiliary information to the first terminal, the method further comprises:
receiving, by the second terminal, a first positioning signal sent by the first terminal;
the positioning auxiliary information comprises: time difference information that is used to indicate a time difference between time when the second terminal receives the first positioning signal and time when the second terminal sends a second positioning signal;
wherein the positioning auxiliary information further comprises speed information and speed direction information of the second terminal.

9. The method of claim 8, wherein the positioning auxiliary information comprises: timestamp information of a sending moment of the second positioning signal.

10. The method of claim 8, further comprises: sending, by the second terminal, a third positioning signal to a network-side device, so that the network-side device determines position information of the second terminal relative to the network-side device or absolute position information of the second terminal according to the third positioning signal.

11. A second terminal for positioning, comprises: a processor, a memory and a transceiver;
wherein the processor is configured to read programs in the memory and execute the method of claim 8.

12. A location method, comprises:
receiving, by a network-side device, a third positioning signal sent by a first terminal and a fourth positioning signal sent by a second terminal;
sending, by the network-side device, positioning auxiliary information to the first terminal;
wherein the positioning auxiliary information comprises: position information of the first terminal relative to the network-side device, position information of the second terminal relative to the network-side device, and position information of the network-side device; wherein the position information of the first terminal relative to the network-side device is obtained by the network-side device through the third positioning signal sent by the first terminal, and the position information of the second terminal relative to the network-side device is obtained by the network-side device through the fourth positioning signal sent by the second terminal; or the positioning auxiliary information comprises: absolute position information of the first terminal and absolute position information of the second terminal; wherein the absolute position information of the first terminal is obtained by the network-side device through the third positioning signal sent by the first terminal, and the absolute position information of the second terminal is obtained by the network-side device through the fourth positioning signal sent by the second terminal.

13. A network-side device for positioning, comprises: a processor, a memory and a transceiver;

wherein the processor is configured to read programs in the memory and execute the method of claim 12.

* * * * *